(12) United States Patent
Chin

(10) Patent No.: US 11,903,066 B2
(45) Date of Patent: Feb. 13, 2024

(54) USER EQUIPMENT, NETWORK NODE, AND METHODS FOR OPERATING THE SAME AGAINST MAXIMUM NUMBER OF ALLOWABLE RADIO BEARERS

(71) Applicant: GUANGDONG OPPO MOBILE TELECOMMUNICATIONS CORP., LTD., Dongguan (CN)

(72) Inventor: Chenho Chin, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 75 days.

(21) Appl. No.: 17/558,899

(22) Filed: Dec. 22, 2021

(65) Prior Publication Data

US 2022/0117019 A1  Apr. 14, 2022

Related U.S. Application Data

(63) Continuation of application No. PCT/CN2019/102650, filed on Aug. 26, 2019.

(51) Int. Cl.
*H04W 76/15* (2018.01)
*H04W 72/53* (2023.01)
(Continued)

(52) U.S. Cl.
CPC ............ *H04W 76/15* (2018.02); *H04W 72/53* (2023.01); *H04W 28/0268* (2013.01); *H04W 88/06* (2013.01)

(58) Field of Classification Search
CPC . H04W 76/18; H04W 72/00; H04W 72/0493; H04W 36/0027; H04W 76/15
(Continued)

(56) References Cited

U.S. PATENT DOCUMENTS 9,119,183 B2  8/2015 Guo
9,906,991 B1  2/2018 Peddiraju et al.
(Continued)

FOREIGN PATENT DOCUMENTS

CN  108702802 A  10/2018
WO  WO-2016058558 A1 * 4/2016  ........ H04W 36/0027
(Continued)

OTHER PUBLICATIONS

R. Nossenson, "Long-term evolution network architecture," 2009 IEEE International Conference on Microwaves, Communications, Antennas and Electronics Systems, Tel Aviv, Israel, 2009, pp. 1-4, doi: 10.1109/COMCAS.2009.5385947. (Year: 2009).*
(Continued)

*Primary Examiner* — William D Cumming
(74) *Attorney, Agent, or Firm* — BAYES PLLC

(57) ABSTRACT

A UE, a network node, and methods for operating the same against maximum number of allowable radio bearers are provided. The method for operating the UE includes operating in a CIoT mode, wherein the UE is capable of operating in a normal cellular communication mode and capable of operating in the CIoT mode; determining, out of at least one UE-data network logical connection, a first UE-data network logical connection in a first set of the at least one UE-data network logical connection for which a radio bear request is to be made based on a UE-data network logical connection type correspondingly of each UE-data network logical connection of the first set of the at least one UE-data network logical connection being non-IP to prevent more than a maximum number of allowable radio bearers for the UE to be requested.

14 Claims, 13 Drawing Sheets

(51) Int. Cl.
 H04W 28/02 (2009.01)
 H04W 88/06 (2009.01)
(58) Field of Classification Search
 USPC .............................. 455/452.2; 370/452, 352
 See application file for complete search history.

(56) References Cited

U.S. PATENT DOCUMENTS

| | | | |
|---|---|---|---|
| 2010/0128722 A1* | 5/2010 | Madour | H04W 76/18 370/352 |
| 2012/0208548 A1* | 8/2012 | Park | H04W 72/00 455/452.2 |
| 2014/0105125 A1 | 4/2014 | Chaponniere et al. | |
| 2019/0016483 A1* | 1/2019 | Ewing | B64G 1/641 |
| 2022/0117019 A1* | 4/2022 | Chin | H04W 76/15 |

FOREIGN PATENT DOCUMENTS

| | | | | |
|---|---|---|---|---|
| WO | 2017189043 A1 | 11/2017 | | |
| WO | WO-2021035497 A1 * | 3/2021 | ........ | H04W 72/0493 |

OTHER PUBLICATIONS

International Search Report and the Written Opinion dated Jun. 2, 2020 From the International Searching Authority Re. Application No. PCT/CN2019/102650.

Nokia et al. CT4 impacts for support of Extended Coverage and NB-Iot 3GPP TSG CT4 Meeting #74 C4-164051, Dated Jul. 29, 2016.

VODAFONE Secondary Cell ID Reporting—completion and signalling efficiency 3GPP SA WG2 Meeting #133 S2-1905584, Dated May 17, 2019.

Ericsson et al. Ethernet PDN connection 3GPP TSG CT WGI Meeting#116 C1-192715, Dated Apr. 12, 2019.

ZTE Restrict the Number of EPS Bearers 3GPP TSG CT4 Meeting #74bis C4-165179, Dated Oct. 21, 2016.

LTE. Evolved Universal Terrestrial Radio Access (E-UTRA), Radio Resource Control (RRC), Protocol specification, 3GPP TS 36.331 version 10.5.0 Release 10, Mar. 2012.

Universal Mobile Telecommunications System (UMTS), LTE, 5G, Non-Access-Stratum (NAS) protocol for Evolved Packet System (EPS), Stage 3, 3GPP TS 24.301 version 15.4.0 Release 15, Oct. 2018.

5G,NR, Radio Resource Control (RRC), Protocol specification, 3GPP TS 38.331 version 15.3.0 Release 15, Oct. 2018.

5G, Non-Access-Stratum (NAS) protocol for 5G System (5GS), Stage 3, 3GPP TS 24.501 version 15.3.0 Release 15, May 2019.

S2-1908552/C1-194050—Reply LS on support for flow based QoS & slicing for NB-IoT & eMTC connected to 5GC, SA WG2 Meeting #133, Sapporo, Japan, Jun. 24-28, 2019/ 3GPP TSG CT WG1 Meeting #119, Wroclaw (Poland), Dated Aug. 26-30, 2019.

* cited by examiner

USER EQUIPMENT, NETWORK NODE, AND METHODS FOR OPERATING THE SAME AGAINST MAXIMUM NUMBER OF ALLOWABLE RADIO BEARERS

CROSS REFERENCE TO RELATED APPLICATIONS

This application is a continuation of an International Application No. PCT/CN2019/102650, entitled "USER EQUIPMENT, NETWORK NODE, AND METHODS FOR OPERATING THE SAME AGAINST MAXIMUM NUMBER OF ALLOWABLE RADIO BEARERS", filed on Aug. 26, 2019, which is incorporated by reference in the present application in its entirety.

BACKGROUND OF DISCLOSURE

1. Field of Disclosure

The present disclosure relates to the field of communication systems, and more particularly, to a user equipment, a network node, and methods for operating the same against maximum number of allowable radio bearers.

2. Description of Related Art

When the 3rd Generation Partnership Project (3GPP) decided to provide support for Internet of Things (IoT) type of services, under the general Cellular IoT (CIoT), 3GPP introduced a number of variants for IoT support, mainly based on a bandwidth allocated to such IoT support. For instance, in 3GPP, there is Wide Band IoT (WB-IoT), Narrow Band IoT (NB-IoT), and even Control Plane CIoT (CP CIoT).

Compared to mobile broadband protocols, CIoT is a feature where the Radio Access Network (RAN) has set aside a limited amount of radio spectrum/frequencies/bands to support IoT use and deployment. This limited amount of radio resource thus translates to limited amount of radio bearers.

For example, when NB-IoT was introduced to Long Term Evolution (LTE)/System Architecture Evolution (SAE), 3GPP has set a limit that in NB-IoT, only a maximum of two data radio bearers (DRBs) are supported, as mentioned in subclause 5.3.1.4 in 3GPP technical specification (TS) 36.331 and in subclause 5.6.1.4.2 in 3GPP TS 24.301. This support of maximum of two DRBs is adhered to in 5G systems (5GSs) even for Release 16 (Rel-16), as mentioned in LS 52-1908552/C1-194050. When the 3rd Generation Partnership Project (3GPP) decided to provide support for Internet of Things (IoT) type of services, under the general Cellular IoT (CIoT), 3GPP introduced a number of variants for IoT support, mainly based on a bandwidth allocated to such IoT support. For instance, in 3GPP, there is Wide Band IoT (WB-IoT), Narrow Band IoT (NB-IoT), and even Control Plane CIoT (CP CIoT).

Compared to mobile broadband protocols, CIoT is a feature where the Radio Access Network (RAN) has set aside a limited amount of radio spectrum/frequencies/bands to support IoT use and deployment. This limited amount of radio resource thus translates to limited amount of radio bearers.

For example, when NB-IoT was introduced to Long Term Evolution (LTE)/System Architecture Evolution (SAE), 3GPP has set a limit that in NB-IoT, only a maximum of two data radio bearers (DRBs) are supported, as mentioned in subclause 5.3.1.4 in 3GPP technical specification (TS) 36.331 and in subclause 5.6.1.4.2 in 3GPP TS 24.301. This support of maximum of two DRBs is adhered to in 5G systems (5GSs) even for Release 16 (Rel-16), as mentioned in LS 52-1908552/C1-194050.

SUMMARY

An object of the present disclosure is to propose a user equipment, a network node, and methods for operating the same against maximum number of allowable radio bearers.

In a first aspect of the present disclosure, a user equipment (UE), includes: a memory module; a transceiver module; and a processor module operatively coupled with the memory module and the transceiver module, being capable of causing the UE to operate in a normal cellular communication mode, and being capable of causing the UE to operate in a Cellular Internet of Things (CIoT) mode; wherein the processor module is configured to cause the UE to perform steps including: operating in the CIoT mode; determining, out of at least one UE-data network logical connection, a first UE-data network logical connection in a first set of the at least one UE-data network logical connection for which a radio bear request is to be made based on a UE-data network logical connection type correspondingly of each UE-data network logical connection of the first set of the at least one UE-data network logical connection being non-internet protocol (non-IP) to prevent more than a maximum number of allowable radio bearers for the UE to be requested; and making the radio bearer request for the first UE-data network logical connection.

In a second aspect of the present disclosure, a network node for a cellular communication network, including: a memory module; a transceiver module; and a processor module operatively coupled with the memory module and the transceiver module, being capable of causing the network node to operate in a normal cellular communication mode, and being capable of causing the network node to operate in a CIoT mode; wherein the processor module is configured to cause the network node to perform steps including: operating in the CIoT mode; determining, out of at least one user equipment (UE)-data network logical connection for a UE, a first UE-data network logical connection in a first set of the at least one UE-data network logical connection for which a radio bearer allocation acceptance is to be performed based on a UE-data network logical connection type correspondingly of each UE-data network logical connection of the first set of the at least one UE-data network logical connection of the at least one UE-data network logical connection being non-internet protocol (non-IP) to prevent more than a maximum number of allowable radio bearers for the UE to be allocated; and performing the radio bearer allocation acceptance for the first UE-data network logical connection.

In a third aspect of the present disclosure, a method for operating a UE, including: operating in a Cellular Internet of Things (CIoT) mode, wherein the UE is capable of operating in a normal cellular communication mode and is capable of operating in the CIoT mode; determining, out of at least one UE-data network logical connection, a first UE-data network logical connection in a first set of the at least one UE-data network logical connection for which a radio bear request is to be made based on a UE-data network logical connection type correspondingly of each UE-data network logical connection of the first set of the at least one UE-data network logical connection being non-internet protocol (non-IP) to prevent more than a maximum number of allowable radio bearers for the UE to be requested; and making the radio bearer request for the first UE-data network logical connection.

In a fourth aspect of the present disclosure, a method for operating a network node for a cellular communication network, including: operating in a CIoT mode, wherein the network node is capable of operating in a normal cellular communication mode and is capable of operating in the CIoT mode; determining, out of at least one UE-data network logical connection for a UE, a first UE-data network logical connection in a first set of the at least one UE-data network logical connection for which a radio bearer allocation acceptance is to be performed based on a UE-data network logical connection type correspondingly of each UE-data network logical connection of the first set of the at least one UE-data network logical connection of the at least one UE-data network logical connection being non-IP to prevent more than a maximum number of allowable radio bearers for the UE to be allocated; and performing the radio bearer allocation acceptance for the first UE-data network logical connection.

In a fifth aspect of the present disclosure, a method for operating a network node for a cellular communication network, including: operating in a CIoT mode, wherein the network node is capable of operating in a normal cellular communication mode and is capable of operating in the CIoT mode; determining, out of at least one UE-data network logical connection for a UE, a first UE-data network logical connection in a first set of the at least one UE-data network logical connection for which a radio bearer allocation acceptance is to be performed based on a UE-data network logical connection type correspondingly of each UE-data network logical connection of the first set of the at least one UE-data network logical connection of the at least one UE-data network logical connection being non-internet protocol (non-IP) to prevent more than a maximum number of allowable radio bearers for the UE to be allocated; and performing the radio bearer allocation acceptance for the first UE-data network logical connection.

In a sixth aspect of the present disclosure, a non-transitory machine-readable storage medium having stored thereon program instructions that, when executed by a processor module of a user equipment (UE), cause the UE to perform the above method for operating the UE.

In a seventh aspect of the present disclosure, a non-transitory machine-readable storage medium having stored thereon program instructions that, when executed by a processor module of a network node for a cellular communication network, cause the network node to perform the above method for operating the network node.

In an eighth aspect of the present disclosure, a terminal device, including: a processor module and a memory module configured to store program instructions, wherein the processor module is configured to execute the program instructions stored in the memory module to perform the above method for operating the UE.

BRIEF DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION OF EMBODIMENTS

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, and does not limit the disclosure.

As used here, a device, an element, a method, or a step being employed as described by using a term such as "use", or "using" refers to a case in which the device, the element, the method, or the step is directly employed, or indirectly employed through an intervening device, an intervening element, an intervening method, or an intervening step.

Figure 1:
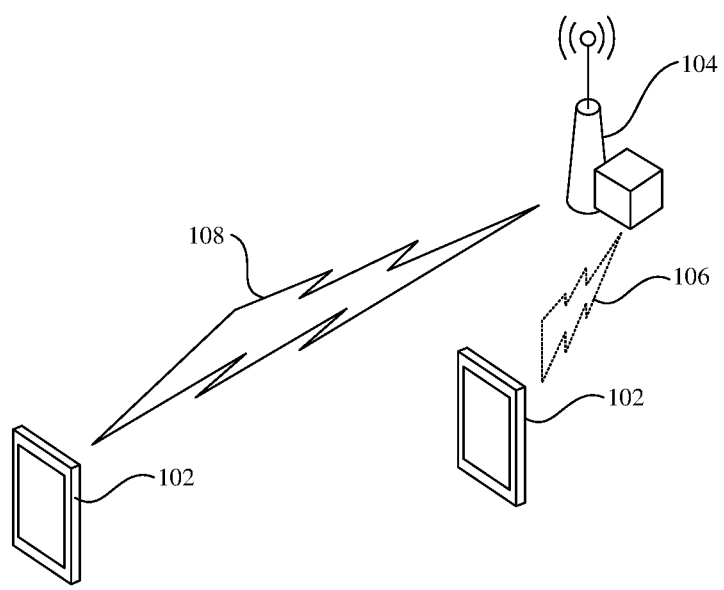
FIG. 1 is a schematic diagram illustrating an advantage of some embodiments of the present disclosure in a limited coverage environment.

FIG. 1 is a schematic diagram illustrating an advantage of some embodiments of the present disclosure in a limited coverage environment. Communication between a cellular communication network and a user equipment (UE) such as a UE 102 may be under any one of two modes, namely a normal cellular communication mode and a Cellular Internet of Things (CIoT) mode. For the normal cellular communication mode, the cellular communication network and the UE 102 are operated under a mobile broadband protocol. The mobile broadband protocol may be an enhanced mobile broadband protocol for 5G.

Alternatively, the mobile broadband protocol may be Long Term Evolution (LTE) for 4G. For the CIoT mode, the cellular communication network and the UE 102 are operated under a CIoT protocol. The CIoT protocol may be Narrow Band IoT (NB-IoT) using data radio bearers (DRBs).

Alternatively, the CIoT protocol may be Wide Band IoT (WB-IoT) such as LTE-machine type communication (MTC). Still alternatively, the CIoT protocol may be Control Plane CIoT (CP CIoT) using signaling radio bearers (SRBs) such as CP CIoT 5G System (5GS) Optimisation of NB-IoT for 5G or CP CIoT Evolved Packet System (EPS) Optimisation of NB-IoT for 4G. NB-IoT using DRBs is referred to as NB-IoT hereafter. All these IoT protocols can be viewed as subsets or tweaks or adaptations of the mobile broadband protocols adjusted to fit IoT needs.

In the cellular communication network, a base station may be operated under any one of the normal cellular communication mode and the CIoT mode. The base station may be a next generation node B (gNB) 104 for 5G. Alternatively, the base station may be an evolved node B (eNB) for 4G. A coverage area of a cell of the gNB 104 operated under the normal cellular communication mode may be smaller than an extended coverage area of a cell of the gNB 104 operated under the CIoT mode. With the extended coverage area, the gNB 104 may provide CIoT coverage in parking lots, parking garages, basements, etc. where there is no or limited mobile broadband coverage.

The UE 102 may be operated under any one of the normal cellular communication mode and the CIoT mode. The UE 102 may be a mobile phone, a navigation device, a notebook, a personal digital assistant (PDA), a tablet personal computer (PC), or any portable electronic device that is capable of operating under the normal cellular communication mode and capable of operating under the CIoT mode. Both a non-IoT application and an IoT application of the UE 102 may be run under any one of the normal cellular communication mode and the CIoT mode. An example of a non-IoT application may be an instant message application such as WeChat. An example of an IoT application may be a personal IoT application for health such as a heart rate monitor.

In a first scenario, when the UE 102 is within the coverage area of the cell of the gNB 104, the UE 102 is operated under the normal cellular communication mode, as indicated by communications 106 between the UE 102 and the gNB 104. When the UE 102 is in the limited coverage environment, for example, moved out of the coverage area but still in the extended coverage area, the UE 102 switches from the normal cellular communication mode into the CIoT mode, as indicated by communications 108 between the UE 102 and the gNB 104. When switched to the CIoT mode, the UE 102 is subjected to a maximum number of radio bearers for the CIoT mode. For example, as mentioned above, for NB-IoT, only a maximum of two data radio bearers (DRBs) are supported.

Applications (and its services) of the UE 102 are tied to UE-data network logical connections. Each UE-data network logical connection can be used by one or more of the applications. Each UE-data network logical connection may be a protocol data unit (PDU) session for 5G. Each PDU session is associated to a service name, which is a data network name (DNN). Each PDU session has its own DRB.

Alternatively, each UE-data network logical connection may be a packet data network (PDN) connection for 4G. The PDN connection may include one default EPS bearer context and zero or more dedicated EPS bearer context. The zero or more dedicated EPS bearer context are assigned to and managed under the default EPS bearer context. The default EPS bearer context is associated to a service name, which is an access point name (APN). Each context (default or dedicated) has its own DRB.

One advantage of some embodiments of the present disclosure is that under the CIoT mode, a UE-data network logical connection of the IoT application trying to communicate with an IoT server is given a higher priority to get a radio bearer set, because IoT is what the CIoT mode is for. It is particularly true when the IoT application such as the heart rate monitor for a patient intends for the UE-data network logical connection to be as persistent as possible in the CIoT mode that is invoked, for example, in the limited coverage environment.

Figure 2:
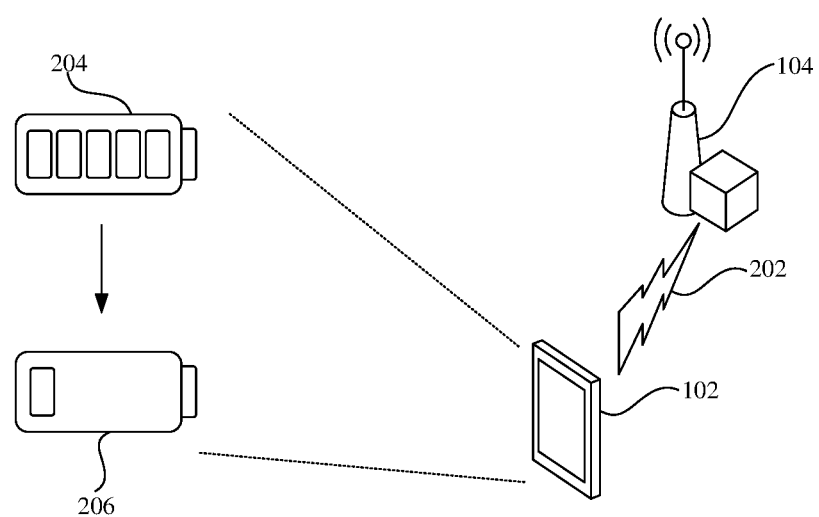
FIG. 2 is a schematic diagram illustrating an advantage of some embodiments of the present disclosure under a low battery power level condition.

FIG. 2 is a schematic diagram illustrating an advantage of some embodiments of the present disclosure under a low battery power level condition. The UE 102 that is operated under the normal cellular communication mode may be optimized for high speed and therefore has a higher power consumption, and the UE 102 that is operated under the CIoT mode may be optimized for power and therefore has a lower power consumption. Compared to the first scenario, a second scenario involves that when the UE 102 has, for example, a full battery power level 204 and is within the coverage area of the cell of the gNB 104 operated under the normal cellular communication mode, the UE 102 is operated under the normal cellular communication mode. When the UE 102 is under the low battery power level condition, for example, a battery power level of the UE being a low battery power level 206, and is within the coverage area of the cell of the gNB 104 operated under the normal cellular communication mode, the UE 102 switches from the normal cellular communication mode into the CIoT mode, as indicated by communications 202 between the UE 102 and the gNB 104. Even with good battery level, switching to CIoT mode can conserve battery. For instance, low maintenance (or no maintenance) monitoring and reporting devices such as gas or utility meters can by always operating in IoT mode can expect years of operation without battery change. When switched to the CIoT mode, the UE 102 is subjected to the maximum number of radio bearers for the CIoT mode.

One advantage of some embodiments of the present disclosure is that under the CIoT mode, a UE-data network logical connection of the IoT application trying to communicate with an IoT server is given a higher priority to get a radio bearer set, because IoT is what the CIoT mode is for.

It is particularly true when the IoT application such as the heart rate monitor for a patient intends for the UE-data network logical connection to be as persistent as possible in the CIoT mode that is invoked, for example, under the low battery power level condition.

Figure 3:
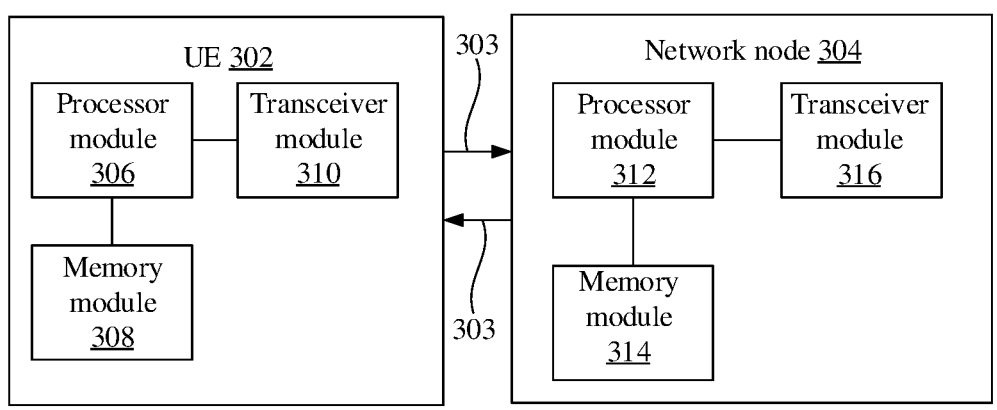
FIG. 3 is a block diagram illustrating a user equipment (UE) communicating with a network node in accordance with some embodiments of the present disclosure.

FIG. 3 is a block diagram illustrating a UE 302 communicating with a network node 304 in accordance with some embodiments of the present disclosure. The UE 302 communicates with the network node 304 though at least one communicative path 303. The at least one communicative path 303 includes a portion between UE 302 and a core network of the cellular communication network and a portion within the core network to the network node 304. The UE 302 may be the UE 102 in FIG. 1 or FIG. 2. The portion between the UE 302 and the core network of the at least one communicative path 303 may include the base station described with reference to FIG. 1 or FIG. 2. The base station may be the gNB 104 in FIG. 1 or FIG. 2. The network node 304 may be a session management function (SMF) for 5G. Alternatively, the network node 304 may be a mobility entity management (MMF) for 4G.

The UE 302 includes a processor module 306, a memory module 308, and a transceiver module 310. The network node 304 may include a processor module 312, a memory module 314, and a transceiver module 316. The processor module 306 or 312 is operatively coupled with (i.e., directly or indirectly connected with) the memory module 308 or 314 and the transceiver module 310 or 316. The processor module 306 or 312 is capable of causing the UE 302 or the network node 304 to operate in the normal cellular communication mode and is capable of causing the UE 302 or the network node 304 to operate in the CIoT mode, and is configured to perform a method 400 or 800 to be described with reference to FIG. 4 or FIG. 8. The memory module 308 or 314 stores a variety of information to operate the processor module 306 or 312. The transceiver module 310 transmits and/or receives a radio signal. The transceiver module 316 transmits and/or receives information about the UE 302 from the portion within the core network.

The processor module 306 or 312 may include an application-specific integrated circuit (ASIC), other chipsets, logic circuit and/or data processing devices. The memory module 308 or 314 may include a read-only memory (ROM), a random access memory (RAM), a flash memory, a memory card, a storage medium and/or other storage devices. The transceiver 310 may include baseband circuitry to process radio frequency signals. When the embodiments are implemented in software, the techniques described herein can be implemented with modules (e.g., procedures, functions, and so on) that perform the functions described herein. The modules can be stored in the memory module 308 or 314 and executed by the processor module 306 or 312. The memory module 308 or 314 can be implemented within the processor module 306 or 312 or external to the processor module 306 or 312, in which those can be communicatively coupled to the processor module 306 or 312 via various means are known in the art.

Figure 4:
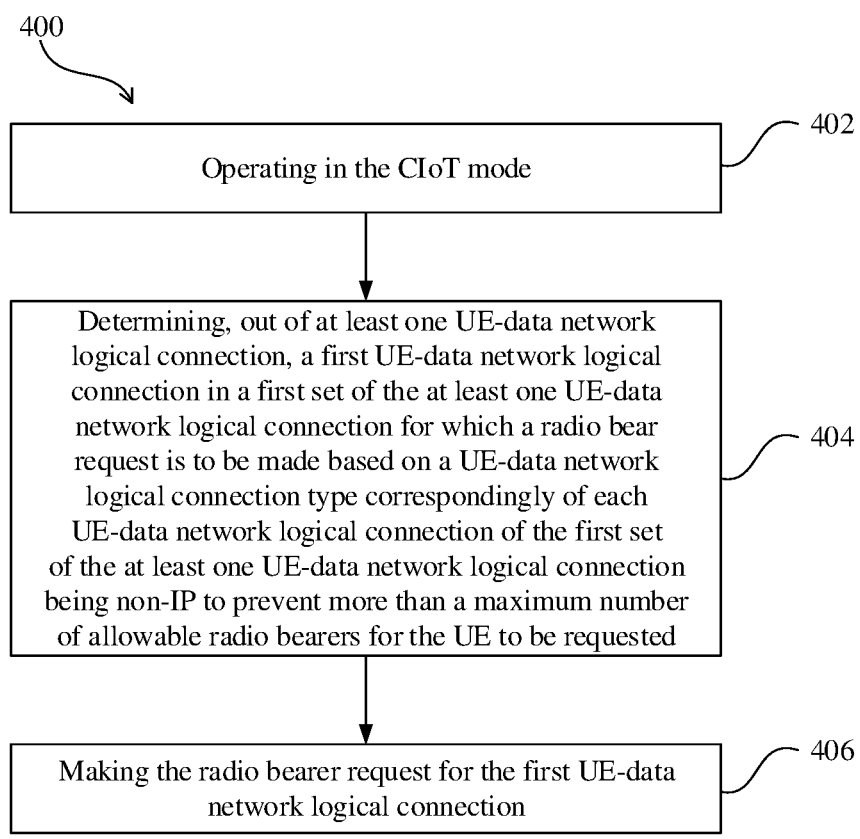
FIG. 4 is a flowchart illustrating a method for operating the UE against a maximum number of allowable radio bearers in accordance with some embodiments of the present disclosure.

FIG. 4 is a flowchart illustrating a method 400 for operating the UE 302 in FIG. 3 against a maximum number of allowable radio bearers in accordance with some embodiments of the present disclosure. The method 400 for operating the UE 302 against a maximum number of allowable radio bearers includes the following steps.

In a step 402, the UE 302 is operated in the CIoT mode. For example, before the UE 302 is operated in an NB-IoT mode, the UE 302 may power up and make a registration to a first cellular communication network. The first cellular communication network may accept the request to register but indicate that "NB-IoT not allowed". Upon registration accept, an application set of the UE 302 starts up. The application set includes X number of applications a portion of which is Y number of non-IoT application(s), and the other portion of which is Z number of IoT application(s). Because the UE 302 is told "NB-IoT not allowed", the UE 302 is operated under the normal cellular communication mode. The UE 302 starts establishing a UE-data network logical connection set for the application set. Establishing a UE-data network logical connection is to be described with reference to FIG. 6. The UE-data network logical connection set includes X number of UE-data network logical connections. The UE 302 gets a radio bearer set for the UE-data network logical connection set as a result. The radio bearer set include X number of DRBs corresponding to the X number of UE-data network logical connections. Then when there is no data activity over the radio bear set, the radio bearer set is released. The UE 302 then moves around and to another registration area (or Tracking Area) and so needs to perform a registration update with a second cellular communication network. With this registration update, the UE 302 is told "NB-IoT allowed". Initially, the UE 302 is operated under the normal cellular communication mode, a first non-IoT application of the Y number of non-IoT application(s) out of the application set wants to exchange data, so one DRB is requested and allocated. When a situation in, for example, any of the first scenario described with reference to FIG. 1 and the second scenario described with reference to FIG. 2 arise, the UE 302 is switched to be operated in the NB-IoT mode. When switched to the NB-IoT mode, the UE 302 is subjected to the maximum number of DRBs for the NB-IoT mode.

In a step 404, the UE 302 determines, out of at least one UE-data network logical connection, a first UE-data network logical connection in a first set of the at least one UE-data network logical connection for which a radio bear request is to be made based on a UE-data network logical connection type correspondingly of each UE-data network logical connection of the first set of the at least one UE-data network logical connection being non-internet protocol (non-IP) to prevent more than a maximum number of allowable radio bearers for the UE 302 to be requested.

The UE 302 may determine, out of a plurality of the UE-data network logical connections, the first UE-data network logical connection in the first set of the UE-data network logical connections for which the radio bear request is to be made based on a UE-data network logical connection type correspondingly of each UE-data network logical connection of only the UE-data network logical connections.

Alternatively, the UE 302 may determine, out of the at least one UE-data network logical connection, the first UE-data network logical connection in the first set of the at least one UE-data network logical connection for which the radio bear request is to be made based on both the at least one UE-data network logical connection for each of which the radio bearer request is to be made and at least one UE-data network logical connection each of which currently has a radio bearer. Deactivation of any of the at least one UE-data network logical connection currently having the radio bearer may be performed for activation of any of the at least one UE-data network logical connection for which the radio bearer request is to be made.

Figure 5:
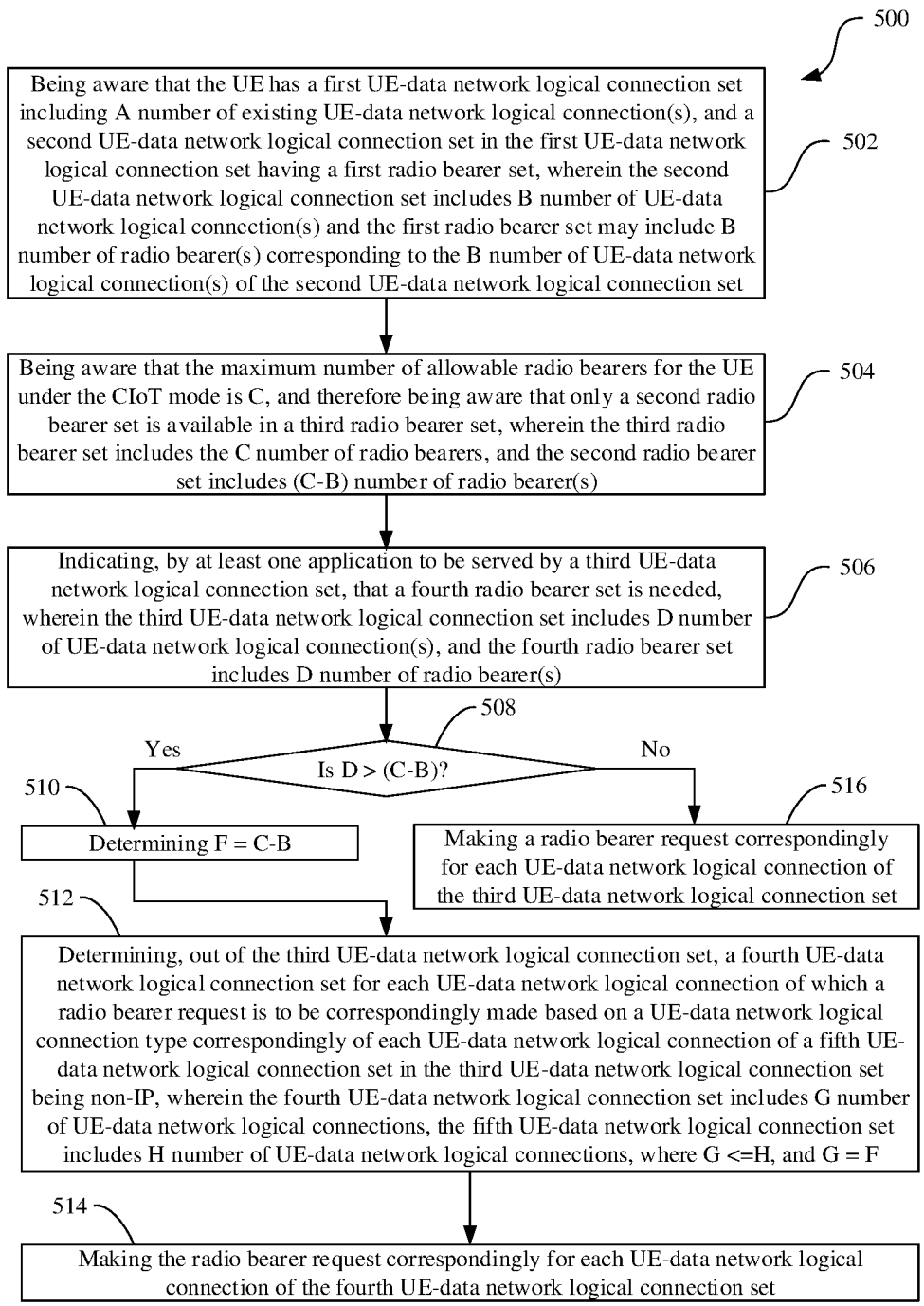
FIG. 5 is a flowchart further illustrating some steps of the method in FIG. 4 in accordance with some embodiments of the present disclosure.

The step 404 may include a step 502, a step 504, a step 506, a step 508, a step 510, and a step 512 in a first path of a method 500 in FIG. 5.

Figure 8:
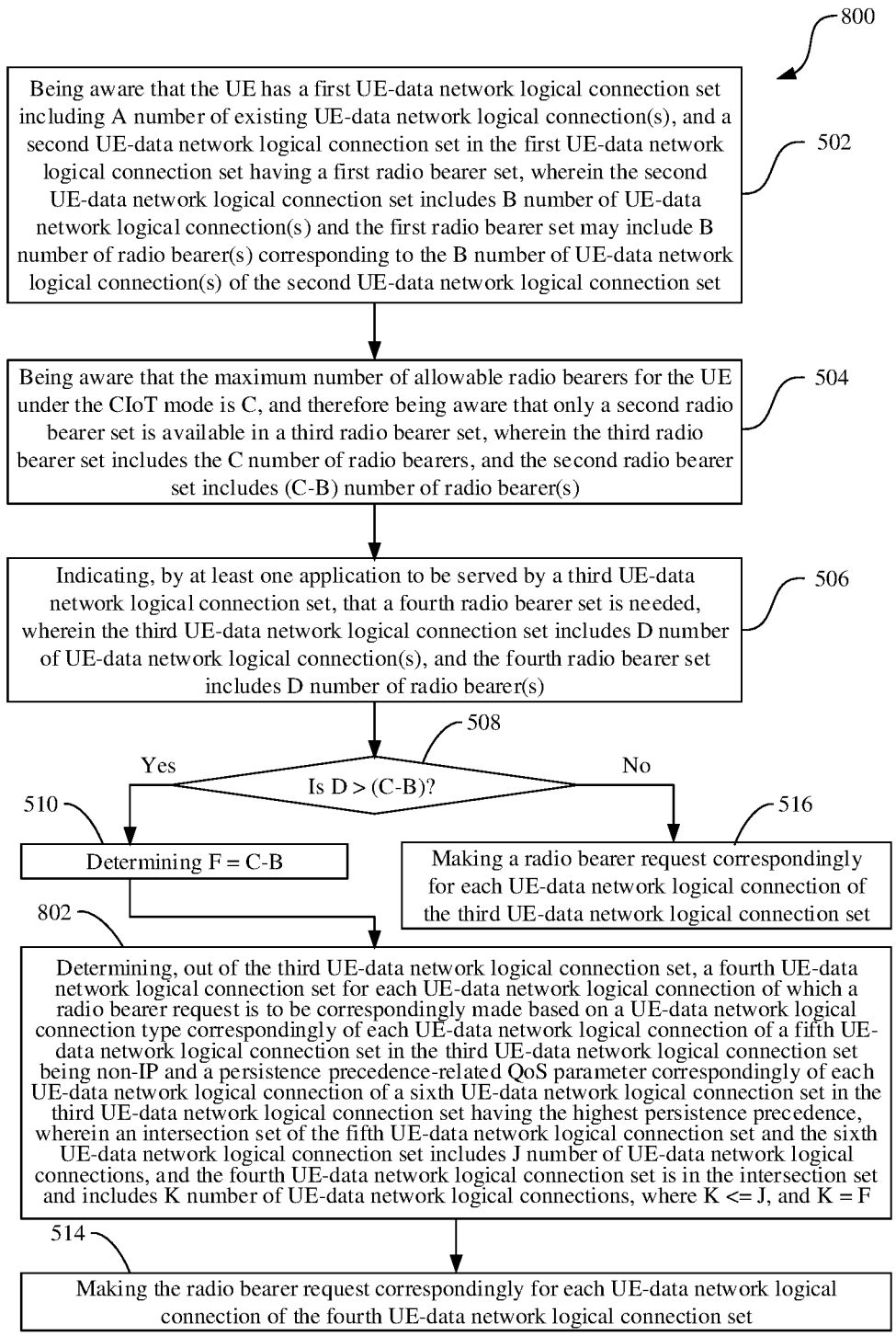
FIG. 8 is a flowchart further illustrating some steps of the method in FIG. 4 in accordance with other embodiments of the present disclosure.

Alternatively, the step 404 may include a step 502, a step 504, a step 506, a step 508, a step 510, and a step 802 in a first path of a method 800 in FIG. 8.

Alternatively, the radio bearer request may arise in a situation where a DRB request is made for a UE-data network logical connection for CP CIoT to be turned into the UE-data network logical connection for NB-IoT.

In a step 406, the UE 302 makes the radio bearer request for the first UE-data network logical connection. The step 406 may include a step 514 in the first path of the method 500 in FIG. 5 or the method 800 in FIG. 8.

FIG. 5 is a flowchart further illustrating some steps of the method in FIG. 4 in accordance with some embodiments of the present disclosure. A method 500 that further illustrates the step 404 and the step 406 in FIG. 4 includes the following steps.

In a step 502, the UE 302 is aware that the UE 302 has a first UE-data network logical connection set including A number of existing UE-data network logical connection(s), and a second UE-data network logical connection set in the first UE-data network logical connection set having a first radio bearer set, wherein the second UE-data network logical connection set includes B number of UE-data network logical connection(s) and the first radio bearer set may include B number of radio bearer(s) corresponding to the B number of UE-data network logical connection(s) of the second UE-data network logical connection set. A is greater than or equal to zero. B is greater than or equal to zero. A is greater than or equal to B. Following the example described for the step 402 in FIG. 4, the first UE-data network logical connection set may serve the application set. In this case, A is equal to X. The second UE-data network logical connection set may serve the first non-IoT application of the Y number of non-IoT application(s) out of the application set. In this case, B is equal to one.

In a step 504, the UE 302 is aware that the maximum number of allowable radio bearers for the UE 302 under the CIoT mode is C, and therefore is aware that only a second radio bearer set is available in a third radio bearer set, wherein the third radio bearer set includes the C number of radio bearers, and the second radio bearer set includes (C−B) number of radio bearer(s). C is greater than B. Following the example described for the step 502, the CIoT mode is the NB-IoT mode, and therefore, C is equal to two, and C−B is equal to one—given that in the NB-IoT mode, the current restriction is 2 DRBs.

In a step 506, at least one application of the UE 302 to be served by a third UE-data network logical connection set indicates that a fourth radio bearer set is needed, wherein the third UE-data network logical connection set includes D number of UE-data network logical connection(s), and the fourth radio bearer set includes D number of radio bearer(s). The D number of radio bearer(s) corresponds to the D number of network logical connection(s) of the third UE-data network logical connection set. The third UE-data network logical connection set may be the at least one UE-data network logical connection in the step 404 in FIG. 4. In the third UE-data network logical connection set, E number of UE-data network logical connection(s) is nonexisting (i.e., not established before) and needs to correspondingly request for E number of radio bearer(s) through E number of establishment request(s), and D-E number of UE-data network logical connection(s) is existing but without radio bearer(s) and needs to correspondingly request for D-E number of radio bearer(s) though D-E number of modification request(s). E is less than or equal to D. 3GPP (technical specification) TS 24.501 and 3GPP TS 24.301 allow several of such establishment requests or modification requests to be made at the same time. A UE-data network logical connection establishment request is to be described with reference to FIG. 6. A UE-data network logical connection modification request is to be described with reference to FIG. 7.

Following the example described for the step 504, the at least one application includes a second non-IoT application of the Y number of non-IoT application(s) in the application set and a first IoT application of the Z number of IoT application(s) in the application set. The second non-IoT application and the first IoT application are to be served by the third UE-data network logical connection set in the step 506. D is equal to two. E is equal to zero.

In a step 508, the UE 302 determines whether D>(C−B). If so, the method 500 proceeds to a step 510; otherwise, the method 500 proceeds to a step 516. Following the example described for the step 506, D is equal to two, C is equal to two, and B is equal to one. Therefore, D is greater than C−B. The method 500 proceeds to the step 510.

In the step 510, the UE 302 determines F=C−B. Following the example described for the step 508, F is equal to one. Therefore, only one DRB is available.

In a step 512, the UE 302 determines, out of the third UE-data network logical connection set, a fourth UE-data network logical connection set for each UE-data network logical connection of which a radio bearer request is to be correspondingly made based on a UE-data network logical connection type correspondingly of each UE-data network logical connection of a fifth UE-data network logical connection set in the third UE-data network logical connection set being non-IP, wherein the fourth UE-data network logical connection set includes G number of UE-data network logical connections, the fifth UE-data network logical connection set includes H number of UE-data network logical connections, where G<=H, and G=F. The fourth UE-data network logical connection set may include the first UE-data network logical connection in the step 404 in FIG. 4. The fifth UE-data network logical connection set may be the first set of the at least one UE-data network logical connection in the step 404 in FIG. 4.

The UE-data network logical connection type may be a PDU session type for 5G. Alternatively, the UE-data network logical connection type may be a PDN type for 4G. For the E number of UE-data network logical connection(s) in the third UE-data network logical connection set that is non-existing, the UE-data network logical connection type correspondingly of each of the E number of UE-data network logical connection(s) may be obtained from correspondingly preparing to create a UE-data network logical connection establishment request. A construct of a "UE-data network logical connection establishment request" message includes a field of the UE-data network logical connection type, as mentioned in 3GPP TS 24.501 and 3GPP TS 24.301. For the D-E number of UE-data network logical connection(s) in the third UE-data network logical connection set that is existing but without radio bearer(s), the UE-data network logical connection type correspondingly of each of the D-E number of UE-data network logical connection(s) may be obtained from existing data in the UE 302, as the D-E number of UE-data network logical connection(s) has been established before.

In the third UE-data network logical connection set, each UE-data network logical connection of a UE-data network logical connection set correspondingly has a UE-data network logical connection type being internet protocol (IP). The step 512 includes determining that the fifth UE-data network logical connection set having the UE-data network logical connection type being non-IP is so considered a higher radio bearer request priority than the UE-data network logical connection set having the UE-data network logical connection type being IP. Because a package of IP is larger than a package of non-IP, and the CIoT mode may be optimized for power, it is more likely that an IoT application uses a UE-data network logical connection type being non-IP to communicate with an IoT server, particularly when the IoT application intends for the UE-data network logical connection to be as persistent as possible in the CIoT mode that is invoked, for example, in the limited coverage environment or under the low battery power level condition. For the UE 302 operated in the CIoT mode, by giving a higher priority to the IoT application that is intended for the UE-data network logical connection to be as persistent as possible in the CIoT mode that is invoked, for example, in the limited coverage environment or under the low battery power level condition, one purpose of the CIoT mode is fulfilled. The UE-data network logical connection type correspondingly of each UE-data network logical connection of the fifth UE-data network logical connection set may be Ethernet for 5G.

Alternatively, the UE-data network logical connection type correspondingly of each UE-data network logical connection of the fifth UE-data network logical connection set may be non-IP in one mode of 4G or Ethernet in another mode of 4G. The UE-data network logical connection type correspondingly of each UE-data network logical connection of the UE-data network logical connection set being IP may be IPv4, IPv6, or IPv4v6 for 5G.

Alternatively, UE-data network logical connection type correspondingly of each UE-data network logical connection of the UE-data network logical connection set being IP may be IPv4, IPv6, or IPv4v6 for 4G.

Following the example described for the step 510, the fifth UE-data network logical connection set having the UE-data network logical connection type being non-IP is for serving the first IoT application, and the UE-data network logical connection set having the UE-data network logical connection type being IP is for serving the second non-IoT application. H is equal to one. The fifth UE-data network logical connection set having the UE-data network logical connection type being non-IP is so considered a higher radio bearer request priority. The fourth UE-data network logical connection set in the fifth UE-data network logical connection set is determined based on F in the step 510. Because F is equal to one and H is equal to one, G is equal to one. Therefore, the first IoT application is determined to get the DRB.

For a case where H=F as in the example above, the fourth UE-data network logical connection set is same as the fifth UE-data network logical connection set. For another case where H>F, because G=F, another criterion may need to be used to further determine the fourth UE-data network logical connection set out of the fifth UE-data network logical connection set. The other criterion may be a UE-data network logical connection characteristic, property, or attribute other than the UE-data network logical connection type. An embodiment that illustrates the case where H>F is provided with reference to FIG. 8.

Alternative to the step 512 where G=F due to, for example, the UE-data network logical connection type being used as the highest criterion for determining which radio bearer request is to be made, the UE-data network logical connection type may be used as a first criterion lower than a second criterion. In this case, I out of the F number of radio bearers may be determined to be not available based on the second criterion. Therefore, G=F−I.

In a step 514, the UE 302 makes the radio bearer request correspondingly for each UE-data network logical connection of the fourth UE-data network logical connection set. The radio bearer request that is the UE-data network logical connection establishment request is to be described with reference to FIG. 6. The radio bearer request that is the UE-data network logical connection modification request is to be described with reference to FIG. 7.

In the step 516, the UE 302 makes a radio bearer request correspondingly for each UE-data network logical connection of the third UE-data network logical connection set. The radio bearer request that is the UE-data network logical connection establishment request is to be described with reference to FIG. 6. The radio bearer request that is the UE-data network logical connection modification request is to be described with reference to FIG. 7.

Figure 6:
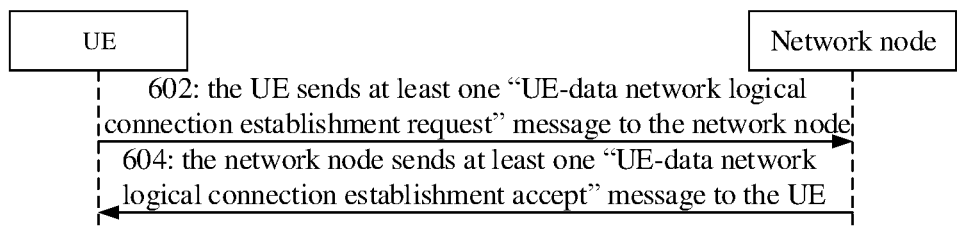
FIG. 6 is a schematic diagram illustrating a UE-requested UE-data network logical connection establishment procedure that is successful for some steps in FIG. 5 in accordance with some embodiments of the present disclosure.

FIG. 6 is a schematic diagram illustrating a UE-requested UE-data network logical connection establishment procedure that is successful for some steps in FIG. 5 in accordance with some embodiments of the present disclosure. To set up a UE-data network logical connection for 5G, Session Management procedures of the non-access stratum (NAS) specified in subclause 5.6 in 3GPP TS 24.501 are used. Alternatively, to set up a UE-data network logical connection for 4G, Session Management procedures specified within clause 6 of 3GPP TS 24.301 are used.

For the UE 302 requesting establishment of a UE-data network logical connection, it is for the network node 304 to accept or reject the request. Because in the step 512 in FIG. 5, the determination to make the radio bearer request for each UE-data network logical connection of the fourth UE-data network logical connection set is against a condition that only the second radio bearer set in the step 504 is available, only a UE-requested UE-data network logical connection establishment procedure that is successful is illustrated. The UE-requested UE-data network logical connection establishment procedure that is successful in the Session Management procedures for 5G or 4G includes the following steps.

In a step 602, the UE 302 sends at least one "UE-data network logical connection establishment request" message to the network node 304. The at least one "UE-data network logical connection establishment request" message in the step 602 may be the UE-data network logical connection establishment request for some steps in FIG. 5. For 5G, the at least one "UE-data network logical connection establishment request" message may be a PDU SESSION ESTABLISHMENT REQUEST message. For 4G, the at least one "UE-data network logical connection establishment request" message may include a PDN CONNECTIVITY REQUEST message for a default EPS bearer and zero or more other message correspondingly for zero or more dedicated EPS bearer.

In a step 604, the network node 304 sends at least one "UE-data network logical connection establishment accept" message to the UE 302. For 5G, the at least one "UE-data network logical connection establishment accept" message may be a PDU SESSION ESTABLISHMENT ACCEPT message. For 4G, the at least one "UE-data network logical connection establishment accept" message may include an ACTIVATE DEFAULT EPS BEARER CONTEXT message for the default EPS bearer and zero or more other message correspondingly for zero or more dedicated EPS bearer. In the normal course of events, when the network node 304 accepts the UE-data network logical connection establishment request, the network node 304 allocates a radio bearer for the UE-data network logical connection making the UE-data network logical connection establishment request.

Figure 7:
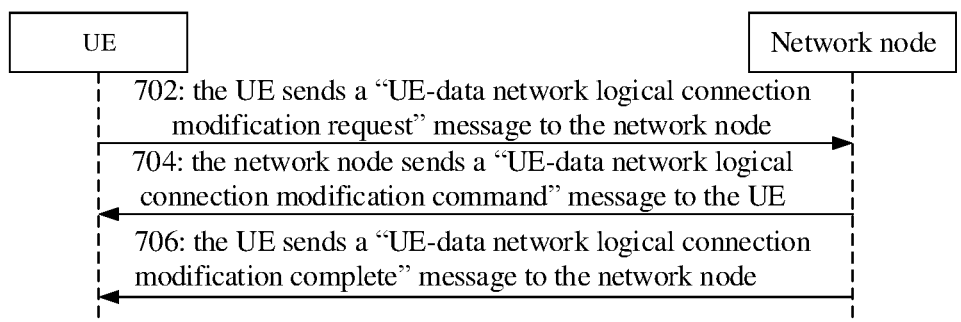
FIG. 7 is a schematic diagram illustrating a UE-requested UE-data network logical connection modification procedure that is successful for some steps in FIG. 5 in accordance with other embodiments of the present disclosure.

FIG. 7 is a schematic diagram illustrating a UE-requested UE-data network logical connection modification procedure that is successful for some steps in FIG. 5 in accordance with other embodiments of the present disclosure. Once a radio bearer is allocated to a UE-data network logical connection, data can be exchanged between the UE 302 on one side and a network/application servers on the other side. And when there is no more data to be exchanged, the radio bearer can be removed/deallocated. But that does not mean the UE-data network logical connection is then removed or released. In fact, the UE-data network logical connection is still "alive" even though there are no radio bearer and the next time an application for that UE-data network logical connection wishes to send or receive data, a radio bearer is then requested again. For requesting a radio bearer for the existing UE-data network logical connection which had been established and kept but whose radio bearer has been subsequently released, the UE 302 uses a UE-requested UE-data network logical connection modification procedure. The UE-requested UE-data network logical connection modification procedure for 5G is specified in subclause 6.4.2 in 3GPP TS 24.501. Alternatively, the UE-requested UE-data network logical connection modification procedure for 4G is specified in subclause 6.5 of 3GPP TS 24.301.

For the UE 302 requesting modification of a UE-data network logical connection, it is for the network node 304 to accept or reject the request. Because in the step 512 in FIG. 5, the determination to make the radio bearer request for each UE-data network logical connection of the fourth UE-data network logical connection set is against a condition that only the second radio bearer set in the step 504 is available, only a UE-requested UE-data network logical connection modification procedure that is successful is illustrated. The UE-requested UE-data network logical connection modification procedure that is successful for 5G includes the following steps.

In a step 702, the UE 302 sends a "UE-data network logical connection modification request" message to the network node 304. The "UE-data network logical connection modification request" message in the step 702 may be the UE-data network logical connection modification request for some steps in FIG. 5. For 5G, the at least one "UE-data network logical connection modification request" message may be a PDU SESSION MODIFICATION REQUEST message.

In a step 704, the network node 304 sends a "UE-data network logical connection modification command" message to the UE 302. For 5G, the "UE-data network logical connection modification command" message may be a PDU SESSION MODIFICATION COMMAND message.

In a step 706, the UE 302 sends a "UE-data network logical connection modification complete" message to the network node 304. For 5G, the "UE-data network logical connection modification command" message may be a PDU SESSION MODIFICATION COMPLETE message.

One advantage of only the UE 302 determining which UE-data network logical connection to request a radio bearer set as in the above embodiments and not determining by the network node 304 is that if the UE 302 were to move into a cellular communication network that does not have a network node for determining which UE-data network logical connection to request a radio bearer set, the UE 302 by only making requests up to the maximum number of allowable radio bearers will then have lessen the number of reject messages from the network node. In addition, the determination only made by UE 302 is both backward and forward compatible.

FIG. 8 is a flowchart further illustrating some steps of the method in FIG. 4 in accordance with other embodiments of the present disclosure. Compared to the method 500 in FIG. 5, a method 800 includes a step 802 instead of the step 512. Compared to the step 512, the UE 302 determines the fourth UE-data network logical connection set further based on a persistence precedence-related quality of service (QoS) parameter correspondingly of each UE-data network logical connection of a sixth UE-data network logical connection set in the third UE-data network logical connection set having the highest persistence precedence.

In the step 802, the UE 302 determines, out of the third UE-data network logical connection set, a fourth UE-data network logical connection set for each UE-data network logical connection of which a radio bearer request is to be correspondingly made based on a UE-data network logical connection type correspondingly of each UE-data network logical connection of a fifth UE-data network logical connection set in the third UE-data network logical connection set being non-IP and a persistence precedence-related QoS parameter correspondingly of each UE-data network logical connection of a sixth UE-data network logical connection set in the third UE-data network logical connection set having the highest persistence precedence, wherein an intersection set of the fifth UE-data network logical connection set and the sixth UE-data network logical connection set includes J number of UE-data network logical connections, and the fourth UE-data network logical connection set is in the intersection set and includes K number of UE-data network logical connections, where K<=J, and K=F.

The fifth UE-data network logical connection set includes H number of UE-data network logical connection(s), where H>F. Therefore, the fourth UE-data network logical connection set is determined out of the intersection set of the fifth UE-data network logical connection set and the sixth UE-data network logical connection set, which is a subset of the fifth UE-data network logical connection set. The persistence precedence-related QoS parameter may be 5QI for 5G.

Alternatively, the persistence precedence-related QoS parameter may be QCI for 4G. For both 5QI and QCI, a value of one indicates that the UE-data network logical connection needs to be persistent, and may have the highest persistence precedence. By determining the fourth UE-data network logical connection set out of the intersection set of the fifth UE-data network logical connection set and the sixth UE-data network logical connection set, wherein the UE-data network logical connection type of the fifth UE-data network logical connection set being non-IP and the persistence precedence-related QoS parameter of the sixth UE-data network logical connection set having the highest persistence precedence, the following advantage is achieved. When an IoT application intends for a UE-data network logical connection to be as persistent as possible in the CIoT mode that is invoked, for example, in the limited coverage environment or under the low battery power level condition, it is more likely that the IoT application uses a UE-data network logical connection type being non-IP and a persistence precedence-related QoS parameter having the highest persistence precedence to communicate with an IoT server, Therefore, the UE-data network logical connection is given a higher priority to get a radio bearer set for the UE-data network logical connection to be as persistent as possible in the CIoT mode.

It is noted that currently, the persistence precedence-related QoS parameter such as 5QI is only assigned when a DRB allocation is done by the network node 304. And until a DRB is allocated and such is indicated to the UE 302, the persistence precedence-related QoS parameter of that UE-data network logical connection such as that PDU session is not known to the UE 302. Therefore, the persistence precedence-related QoS parameter cannot be obtained from a "UE-data network logical connection establishment request" message described with reference to FIG. 6. Each UE-data network logical connection of the third UE-data network logical connection set needs to be existing, so that the persistence precedence-related QoS parameter correspondingly of each UE-data network logical connection of the third UE-data network logical connection set may be obtained from existing data in the UE 302, as each UE-data network logical connection of the third UE-data network logical connection set has been established before. Hence, the radio bearer request throughout the steps in FIG. 8 needs to be a UE-data network logical connection modification request described with reference to FIG. 7.

Following the example described for the step 504 in FIG. 5, for the step 506 in FIG. 8, the at least one application includes a second non-IoT application of the Y number of non-IoT application(s) in the application set and a first IoT application and a second IoT application of the Z number of IoT application(s) in the application set. The fifth UE-data network logical connection set having the UE-data network logical connection type being non-IP is for serving the first IoT application and the second IoT application, and the UE-data network logical connection set having the UE-data network logical connection type being IP is for serving the second non-IoT application. H is equal to two. The sixth UE-data network logical connection set having persistence precedence-related QoS parameter having the highest persistence precedence is for serving the first IoT application, and the second non-IoT application. The intersection set of the fifth UE-data network logical connection set and the sixth UE-data network logical connection set having the UE-data network logical connection type being non-IP and the persistence precedence-related QoS parameter having the highest persistence precedence is so considered a higher radio bearer request priority. J is equal to one. The fourth UE-data network logical connection set in the intersection set is determined based on F in the step 510. Because F is equal to one and J is equal to one, K is equal to one. Therefore, the first IoT application is determined to get the DRB.

Figure 9:
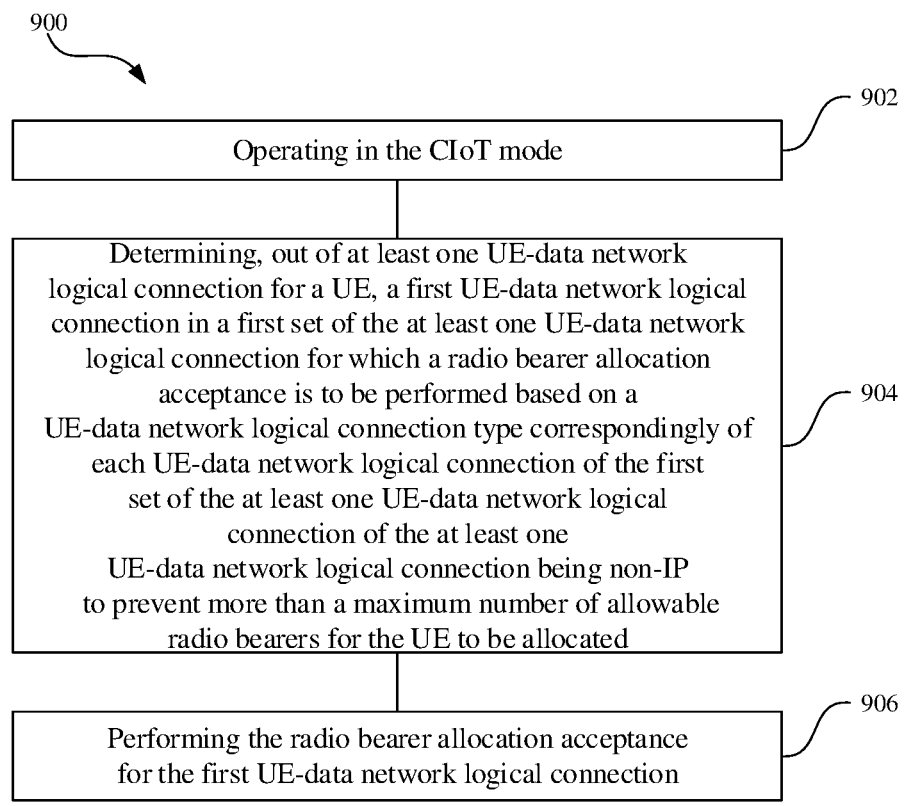
FIG. 9 is a flowchart illustrating a method for operating the network node against a maximum number of allowable radio bearers in accordance with other embodiments of the present disclosure.

FIG. 9 is a flowchart illustrating a method 900 for operating the network node 304 in FIG. 3 against a maximum number of allowable radio bearers in accordance with other embodiments of the present disclosure. The method 900 for operating the network node 304 against a maximum number of allowable radio bearers includes the following steps.

In a step 902, the network node 304 is operated in the CIoT mode. For example, before the UE 302 is operated in an NB-IoT mode, the UE 302 may power up and make a registration to a first cellular communication network. The first cellular communication network may accept the request to register but indicate that "NB-IoT not allowed". Upon registration accept, an application set of the UE 302 starts up. The application set includes X number of applications, a portion of which is Y number of non-IoT application(s), and the other portion of which is Z number of IoT application(s). Because the UE 302 is told "NB-IoT not allowed", the UE 302 is operated under the normal cellular communication mode. The network node 304 is operated under the normal cellular communication mode. The UE 302 starts establishing a UE-data network logical connection set for the application set. Establishing a UE-data network logical connection is to be described with reference to FIG. 11. The UE-data network logical connection set includes X number of UE-data network logical connections. The network node 304 performs a radio bearer allocation acceptance for each UE-data network logical connection of the UE-data network logical connection set. Performing a radio bearer allocation acceptance for the UE-data network logical connection is to be described with reference to FIG. 11. The UE 302 gets a radio bearer set for the UE-data network logical connection set as a result. The radio bearer set include X number of DRBs corresponding to the X number of UE-data network logical connections. Then when there is no data activity over the radio bear set, the radio bearer set is released. The UE 302 then moves around and to another registration area (or Tracking Area) and so needs to perform a registration update with a second cellular communication network. With this registration update, the UE 302 is told "NB-IoT allowed". Initially, the UE 302 is operated under the normal cellular communication mode, a first non-IoT application of the Y number of non-IoT application(s) out of the application set wants to exchange data, so one DRB is requested and allocated. When a situation in, for example, any of the first scenario described with reference to FIG. 1 and the second scenario described with reference to FIG. 2 arise, the UE 302 is switched to be operated in the NB-IoT mode. The network node 304 is operated under the NB-IoT mode. When switched to the NB-IoT mode, the UE 302 is subjected to the maximum number of DRBs for the NB-IoT mode.

In a step 904, the network node 304 determines, out of at least one UE-data network logical connection for the UE 302, a first UE-data network logical connection in a first set of the at least one UE-data network logical connection for which a radio bearer allocation acceptance is to be performed based on a UE-data network logical connection type correspondingly of each UE-data network logical connection of the first set of the at least one UE-data network logical connection being non-IP to prevent more than a maximum number of allowable radio bearers for the UE 302 to be allocated.

The network node 304 may determine, out of a plurality of the UE-data network logical connections for the UE 302, the first UE-data network logical connection in the first set of the UE-data network logical connections for which the radio bearer allocation acceptance is to be performed based on a UE-data network logical connection type correspondingly of each UE-data network logical connection of only the UE-data network logical connections.

Alternatively, the network node 304 may determine, out of the at least one UE-data network logical connection for the UE 302, the first UE-data network logical connection in the first set of the at least one UE-data network logical connection for which the radio bearer allocation acceptance is to be performed based on both the at least one UE-data network logical connection for each of which the radio bearer allocation acceptance is to be performed and at least one UE-data network logical connection each of which currently has a radio bearer.

Deactivation of any of the at least one UE-data network logical connection currently having the radio bearer may be performed for activation of any of the at least one UE-data network logical connection for which the radio bearer allocation acceptance is to be performed.

Figure 10:
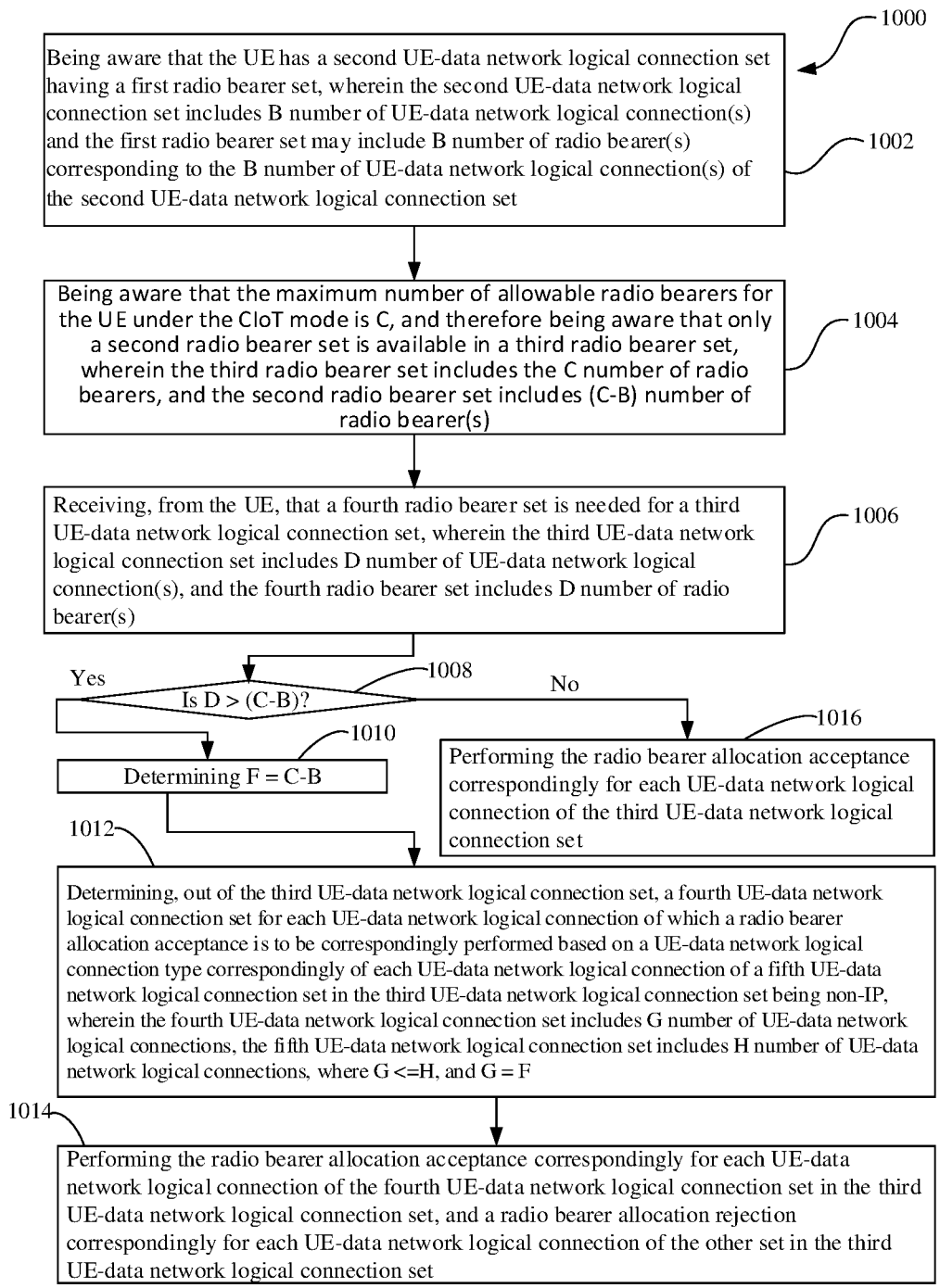
FIG. 10 is a flowchart further illustrating some steps of the method in FIG. 9 in accordance with some embodiments of the present disclosure.

The step 904 may include a step 1002, a step 1004, a step 1006, a step 1008, a step 1010, and a step 1012 in a first path of a method 1000 in FIG. 10.

Figure 15:
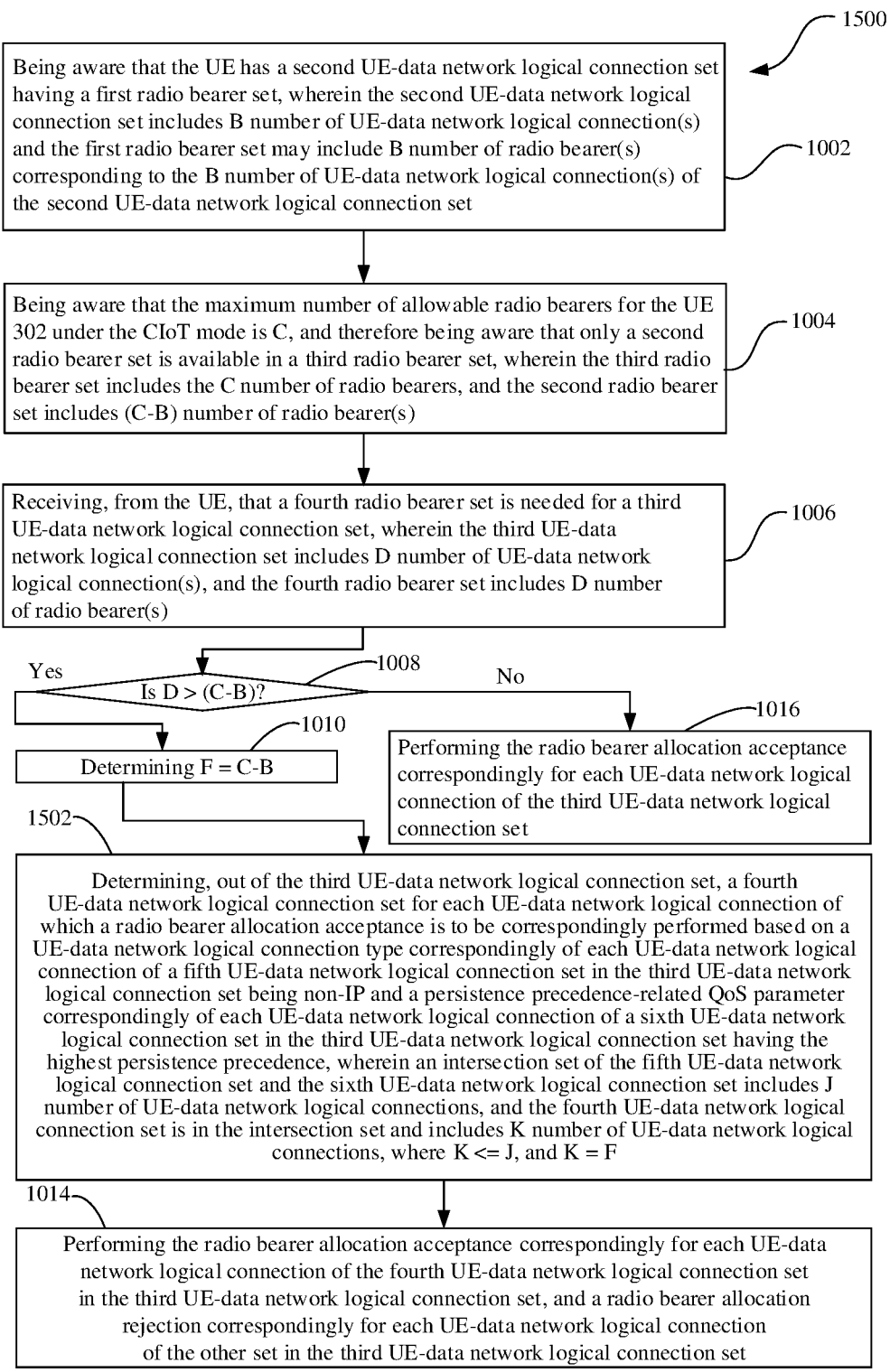
FIG. 15 is a flowchart further illustrating some steps of the method in FIG. 9 in accordance with other embodiments of the present disclosure.

Alternatively, the step 904 may include a step 1002, a step 1004, a step 1006, a step 1008, a step 1010, and a step 1502 in a first path of a method 1500 in FIG. 15.

Alternatively, the radio bearer allocation acceptance may arise in a situation where a DRB allocation acceptance is performed for a UE-data network logical connection for CP CIoT to be turned into the UE-data network logical connection for NB-IoT.

In a step 906, the network node 304 performs the radio bearer allocation acceptance for the first UE-data network logical connection. The step 906 may include a step 1014 in the first path of the method 1000 in FIG. 10 or the method 1500 in FIG. 15.

FIG. 10 is a flowchart further illustrating some steps of the method in FIG. 9 in accordance with some embodiments of the present disclosure. A method 1000 that further illustrates the step 904 and the step 906 in FIG. 9 includes the following steps.

The UE 302 has a first UE-data network logical connection set including A number of existing UE-data network logical connection(s), and a second UE-data network logical connection set in the first UE-data network logical connection set having a first radio bearer set, wherein the second UE-data network logical connection set includes B number of UE-data network logical connection(s) and the first radio bearer set may include B number of radio bearer(s) corresponding to the B number of UE-data network logical connection(s) of the second UE-data network logical connection set. A is greater than or equal to zero. B is greater than or equal to zero. A is greater than or equal to B. In a step 1002, the network node 304 is aware that the UE 302 has the second UE-data network logical connection set having the first radio bearer set. Following the example described for the step 902 in FIG. 9, the first UE-data network logical connection set may serve the application set. In this case, A is equal to X. The second UE-data network logical connection set may serve the first non-IoT application of the Y number of non-IoT application(s) out of the application set. In this case, B is equal to one.

In a step 1004, the network node 304 is aware that the maximum number of allowable radio bearers for the UE 302 under the CIoT mode is C, and therefore is aware that only a second radio bearer set is available in a third radio bearer set, wherein the third radio bearer set includes the C number of radio bearers, and the second radio bearer set includes (C−B) number of radio bearer(s). C is greater than B. Following the example described for the step 1002, the CIoT mode is the NB-IoT mode, and therefore, C is equal to two, and C−B is equal to one—given that in the NB-IoT mode, the current restriction is 2 DRBs.

At least one application of the UE 302 to be served by a third UE-data network logical connection set indicates that a fourth radio bearer set is needed, wherein the third UE-data network logical connection set includes D number of UE-data network logical connection(s), and the fourth radio bearer set includes D number of radio bearer(s). The D number of radio bearer(s) corresponds to the D number of network logical connection(s) of the third UE-data network logical connection set. In the third UE-data network logical connection set, E number of UE-data network logical connection(s) is non-existing (i.e., not established before) and needs to correspondingly request for E number of radio bearer(s) through E number of establishment request(s), and D-E number of UE-data network logical connection(s) is existing but without radio bearer(s) and needs to correspondingly request for D-E number of radio bearer(s) though D-E number of modification request(s). E is less than or equal to D. 3GPP (technical specification) TS 24.501 and 3GPP TS 24.301 allow several of such establishment requests or modification requests to be made at the same time. A UE-data network logical connection establishment request is to be described with reference to FIGS. 11 and 12. A UE-data network logical connection modification request is to be described with reference to FIGS. 13 and 14. In a step 1006, the network node 304 receives, from the UE 302, that the fourth radio bearer set is needed for the third UE-data network logical connection set. The third UE-data network logical connection set may be the at least one UE-data network logical connection in the step 904 in FIG. 9.

Following the example described for the step 1004, the at least one application includes a second non-IoT application of the Y number of non-IoT application(s) in the application set and a first IoT application of the Z number of IoT application(s) in the application set. The second non-IoT application and the first IoT application are to be served by the third UE-data network logical connection set in the step 1006. D is equal to two. E is equal to zero.

In a step 1008, the network node 304 determines whether D>(C−B). If so, the method 1000 proceeds to a step 1010; otherwise, the method 1000 proceeds to a step 1016. Following the example described for the step 1006, D is equal to two, C is equal to two, and B is equal to one. Therefore, D is greater than C−B. The method 1000 proceeds to the step 1010.

In the step 1010, the network node 304 determines F=C−B. Following the example described for the step 1008, F is equal to one. Therefore, only one DRB is available.

In a step 1012, the network node 304 determines, out of the third UE-data network logical connection set for the UE 302, a fourth UE-data network logical connection set for each UE-data network logical connection of which a radio bearer allocation acceptance is to be correspondingly performed based on a UE-data network logical connection type correspondingly of each UE-data network logical connection of a fifth UE-data network logical connection set in the third UE-data network logical connection set being non-IP, wherein the fourth UE-data network logical connection set includes G number of UE-data network logical connections, the fifth UE-data network logical connection set includes H number of UE-data network logical connections, where G<=H, and G=F. The fourth UE-data network logical connection set may include the first UE-data network logical connection in the step 904 in FIG. 9. The fifth UE-data network logical connection set may be the first set of the at least one UE-data network logical connection in the step 904 in FIG. 9.

The UE-data network logical connection type may be a PDU session type for 5G. Alternatively, the UE-data network logical connection type may be a PDN type for 4G. For the E number of UE-data network logical connection(s) in the third UE-data network logical connection set that is non-existing, the UE-data network logical connection type correspondingly of each of the E number of UE-data network logical connection(s) may be obtained from correspondingly preparing to create a UE-data network logical connection establishment acceptance. A construct of a "UE-data network logical connection establishment accept" message includes a field of the UE-data network logical connection type, as mentioned in 3GPP TS 24.501 and 3GPP TS 24.301. For the D-E number of UE-data network logical connection(s) in the third UE-data network logical connection set that is existing but without radio bearer(s), the UE-data network logical connection type correspondingly of each of the D-E number of UE-data network logical connection(s) may be obtained from existing data in the network node 304, as the D-E number of UE-data network logical connection(s) has been established before.

In the third UE-data network logical connection set, each UE-data network logical connection of a UE-data network logical connection set correspondingly has a UE-data network logical connection type being IP. The step 1012 includes determining that the fifth UE-data network logical connection set having the UE-data network logical connection type being non-IP is so considered a higher radio bearer allocation acceptance priority than the UE-data network logical connection set having the UE-data network logical connection type being IP. Because a package of IP is larger than a package of non-IP, and the CIoT mode may be optimized for power, it is more likely that an IoT application uses a UE-data network logical connection type being non-IP to communicate with an IoT server, particularly when the IoT application intends for the UE-data network logical connection to be as persistent as possible in the CIoT mode that is invoked, for example, in the limited coverage environment or under the low battery power level condition. For the UE 302 operated in the CIoT mode, by giving a higher priority to the IoT application that is intended for the UE-data network logical connection to be as persistent as possible in the CIoT mode that is invoked, for example, in the limited coverage environment or under the low battery power level condition, one purpose of the CIoT mode is fulfilled. The UE-data network logical connection type correspondingly of each UE-data network logical connection of the fifth UE-data network logical connection set may be Ethernet for 5G.

Alternatively, the UE-data network logical connection type correspondingly of each UE-data network logical connection of the fifth UE-data network logical connection set may be non-IP in one mode of 4G or Ethernet in another mode of 4G. The UE-data network logical connection type correspondingly of each UE-data network logical connection of the UE-data network logical connection set being IP may be IPv4, IPv6, or IPv4v6 for 5G.

Alternatively, UE-data network logical connection type correspondingly of each UE-data network logical connection of the UE-data network logical connection set being IP may be IPv4, IPv6, or IPv4v6 for 4G.

Following the example described for the step 1010, the fifth UE-data network logical connection set having the UE-data network logical connection type being non-IP is for serving the first IoT application, and the UE-data network logical connection set having the UE-data network logical connection type being IP is for serving the second non-IoT application. H is equal to one. The fifth UE-data network logical connection set having the UE-data network logical connection type being non-IP is so considered a higher radio bearer allocation acceptance priority. The fourth UE-data network logical connection set in the fifth UE-data network logical connection set is determined based on F in the step 1010. Because F is equal to one and H is equal to one, G is equal to one. Therefore, the first IoT application is determined to get the DRB.

For a case where H=F as in the example above, the fourth UE-data network logical connection set is same as the fifth UE-data network logical connection set. For another case where H>F, because G=F, another criterion may need to be used to further determine the fourth UE-data network logical connection set out of the fifth UE-data network logical connection set. The other criterion may be a UE-data network logical connection characteristic, property, or attribute other than the UE-data network logical connection type. An embodiment that illustrates the case where H>F is provided with reference to FIG. 15.

Alternative to the step 1012 where G=F due to, for example, the UE-data network logical connection type being used as the highest criterion for determining which radio bearer allocation acceptance is to be performed, the UE-data network logical connection type may be used as a first criterion lower than a second criterion. In this case, I out of the F number of radio bearers may be determined to be not available based on the second criterion. Therefore, G=F−I.

In a step 1014, the network node 304 performs the radio bearer allocation acceptance correspondingly for each UE-data network logical connection of the fourth UE-data network logical connection set in the third UE-data network logical connection set, and a radio bearer allocation rejection correspondingly for each UE-data network logical connection of the other set in the third UE-data network logical connection set. The radio bearer allocation acceptance that is the UE-data network logical connection establishment acceptance is to be described with reference to FIG. 11. The radio bearer allocation rejection that is the UE-data network logical connection establishment rejection is to be described with reference to FIG. 12. The radio bearer allocation acceptance that is the UE-data network logical connection modification acceptance is to be described with reference to FIG. 13. The radio bearer allocation rejection that is the UE-data network logical connection modification rejection is to be described with reference to FIG. 14.

In the step 1016, the network node 304 performs the radio bearer allocation acceptance correspondingly for each UE-data network logical connection of the third UE-data network logical connection set. The radio bearer allocation acceptance that is the UE-data network logical connection establishment acceptance is to be described with reference to FIG. 11. The radio bearer allocation acceptance that is the UE-data network logical connection modification acceptance is to be described with reference to FIG. 13.

Figure 11:
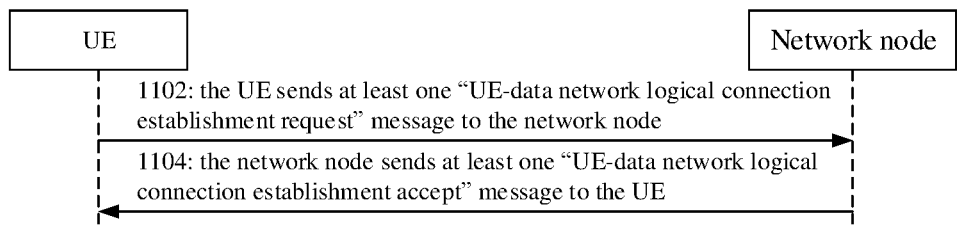
FIG. 11 is a schematic diagram illustrating a UE-requested UE-data network logical connection establishment procedure that is successful for some steps in FIG. 10 in accordance with some embodiments of the present disclosure.

FIG. 11 is a schematic diagram illustrating a UE-requested UE-data network logical connection establishment procedure that is successful for some steps in FIG. 10 in accordance with some embodiments of the present disclosure. To set up a UE-data network logical connection for 5G, Session Management procedures of the non-access stratum (NAS) specified in subclause 5.6 in 3GPP TS 24.501 are used.

Alternatively, to set up a UE-data network logical connection for 4G, Session Management procedures specified within clause 6 of 3GPP TS 24.301 are used.

For the UE 302 requesting establishment of a UE-data network logical connection, it is for the network node 304 to accept or reject the request. The UE-requested UE-data network logical connection establishment procedure that is successful in the Session Management procedures for 5G or 4G includes the following steps.

In a step 1102, the UE 302 sends at least one "UE-data network logical connection establishment request" message to the network node 304. For 5G, the at least one "UE-data network logical connection establishment request" message may be a PDU SESSION ESTABLISHMENT REQUEST message. For 4G, the at least one "UE-data network logical connection establishment request" message may include a PDN CONNECTIVITY REQUEST message for a default EPS bearer and zero or more other message correspondingly for zero or more dedicated EPS bearer.

In a step 1104, the network node 304 sends at least one "UE-data network logical connection establishment accept" message to the UE 302. The at least one "UE-data network logical connection establishment accept" message in the step 1104 may be the UE-data network logical connection establishment acceptance for some steps in FIG. 10. For 5G, the at least one "UE-data network logical connection establishment accept" message may be a PDU SESSION ESTABLISHMENT ACCEPT message. For 4G, the at least one "UE-data network logical connection establishment accept" message may include an ACTIVATE DEFAULT EPS BEARER CONTEXT message for the default EPS bearer and zero or more other message correspondingly for zero or more dedicated EPS bearer. In the normal course of events, when the network node 304 accepts the UE-data network logical connection establishment request, the network node 304 allocates a radio bearer for the UE-data network logical connection making the UE-data network logical connection establishment request.

Figure 12:
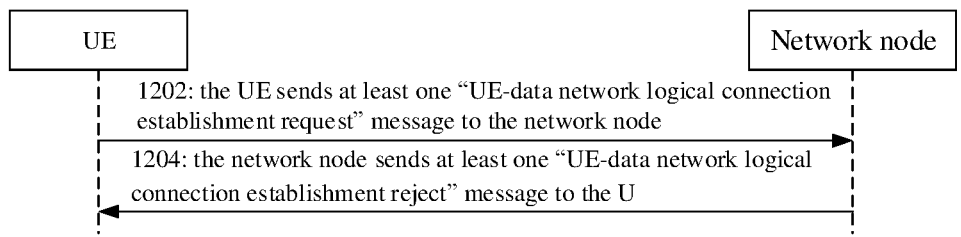
FIG. 12 is a schematic diagram illustrating a UE-requested UE-data network logical connection establishment procedure that is failed for some steps in FIG. 10 in accordance with some embodiments of the present disclosure.

FIG. 12 is a schematic diagram illustrating a UE-requested UE-data network logical connection establishment procedure that is failed for some steps in FIG. 10 in accordance with some embodiments of the present disclosure. Because in the step 1006, the network node 304 receives, from the UE 302, a radio bearer request for each UE-data network logical connection of the third UE-data network logical connection set, and in the step 1012, the network node 304 determines, out of the third UE-data network logical connection set for the UE 302, the fourth UE-data network logical connection set for each UE-data network logical connection of which the radio bearer allocation acceptance is to be correspondingly performed. The network node 304 correspondingly performs the radio bearer allocation rejection for each UE-data network logical connection of the other set in the third UE-data network logical connection set. For the case where the radio bearer allocation rejection is the UE-data network logical connection establishment rejection, the UE-requested UE-data network logical connection establishment procedure that is failed is described below.

In a step 1202, the UE 302 sends at least one "UE-data network logical connection establishment request" message to the network node 304. For 5G, the at least one "UE-data network logical connection establishment request" message may be a PDU SESSION ESTABLISHMENT REQUEST message. For 4G, the at least one "UE-data network logical connection establishment request" message may include a PDN CONNECTIVITY REQUEST message for a default EPS bearer and zero or more other message correspondingly for zero or more dedicated EPS bearer.

In a step 1204, the network node 304 sends at least one "UE-data network logical connection establishment reject" message to the UE 302. The at least one "UE-data network logical connection establishment reject" message in the step 1104 may be the UE-data network logical connection establishment rejection for some steps in FIG. 10. For 5G, the at least one "UE-data network logical connection establishment reject" message may be a PDU SESSION ESTABLISHMENT REJECT message. For 4G, the at least one "UE-data network logical connection establishment reject" message may include an PDN CONNECTIVITY REJECT message for the default EPS bearer and zero or more other message correspondingly for zero or more dedicated EPS bearer.

Figure 13:
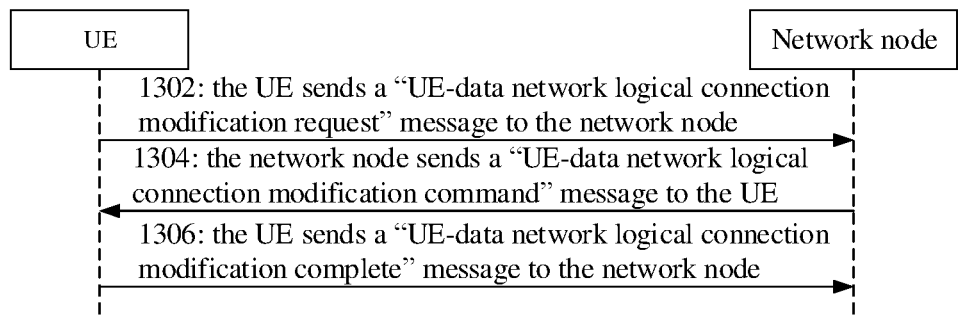
FIG. 13 is a schematic diagram illustrating a UE-requested UE-data network logical connection modification procedure that is successful for some steps in FIG. 10 in accordance with other embodiments of the present disclosure.

FIG. 13 is a schematic diagram illustrating a UE-requested UE-data network logical connection modification procedure that is successful for some steps in FIG. 10 in accordance with other embodiments of the present disclosure. Once a radio bearer is allocated to a UE-data network logical connection, data can be exchanged between the UE 302 on one side and a network/application servers on the other side. And when there is no more data to be exchanged, the radio bearer can be removed/deallocated. But that does not mean the UE-data network logical connection is then removed or released. In fact, the UE-data network logical connection is still "alive" even though there are no radio bearer and the next time an application for that UE-data network logical connection wishes to send or receive data, a radio bearer is then requested again. For requesting a radio bearer for the existing UE-data network logical connection which had been established and kept but whose radio bearer has been subsequently released, the UE 302 uses a UE-requested UE-data network logical connection modification procedure. The UE-requested UE-data network logical connection modification procedure for 5G is specified in subclause 6.4.2 in 3GPP TS 24.501.

Alternatively, the UE-requested UE-data network logical connection modification procedure for 4G is specified in subclause 6.5 of 3GPP TS 24.301.

For the UE 302 requesting modification of a UE-data network logical connection, it is for the network node 304 to accept or reject the request. The UE-requested UE-data network logical connection modification procedure that is successful for 5G includes the following steps.

In a step 1302, the UE 302 sends a "UE-data network logical connection modification request" message to the network node 304. For 5G, the at least one "UE-data network logical connection modification request" message may be a PDU SESSION MODIFICATION REQUEST message.

In a step 1304, the network node 304 sends a "UE-data network logical connection modification command" message to the UE 302. The "UE-data network logical connection modification command" message in the step 1304 may be the UE-data network logical connection modification acceptance for some steps in FIG. 10. For 5G, the "UE-data network logical connection modification command" message may be a PDU SESSION MODIFICATION COMMAND message.

In a step 1306, the UE 302 sends a "UE-data network logical connection modification complete" message to the network node 304. For 5G, the "UE-data network logical connection modification command" message may be a PDU SESSION MODIFICATION COMPLETE message.

Figure 14:
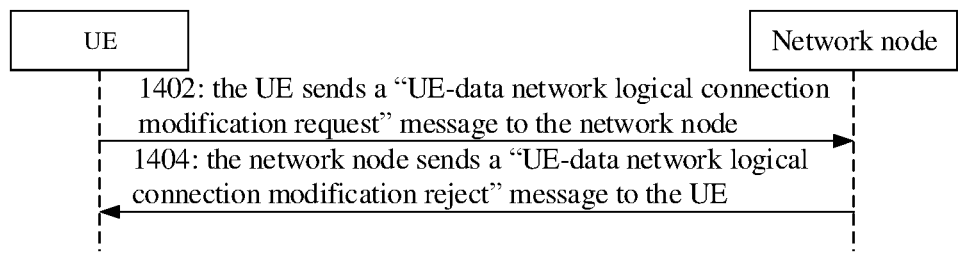
FIG. 14 is a schematic diagram illustrating a UE-requested UE-data network logical connection modification procedure that is failed for some steps in FIG. 10 in accordance with other embodiments of the present disclosure.

FIG. 14 is a schematic diagram illustrating a UE-requested UE-data network logical connection modification procedure that is failed for some steps in FIG. 10 in accordance with some embodiments of the present disclosure. Because in the step 1006, the network node 304 receives, from the UE 302, a radio bearer request for each UE-data network logical connection of the third UE-data network logical connection set, and in the step 1012, the network node 304 determines, out of the third UE-data network logical connection set for the UE 302, the fourth UE-data network logical connection set for each UE-data network logical connection of which the radio bearer allocation acceptance is to be correspondingly performed. The network node 304 correspondingly performs the radio bearer allocation rejection for each UE-data network logical connection of the other set in the third UE-data network logical connection set. For the case where the radio bearer allocation rejection is the UE-data network logical connection modification rejection, the UE-requested UE-data network logical connection modification procedure that is failed is described below.

In a step 1402, the UE 302 sends a "UE-data network logical connection modification request" message to the network node 304. For 5G, the at least one "UE-data network logical connection modification request" message may be a PDU SESSION MODIFICATION REQUEST message.

In a step 1404, the network node 304 sends a "UE-data network logical connection modification reject" message to the UE 302. The "UE-data network logical connection modification reject" message in the step 1404 may be the UE-data network logical connection modification rejection for some steps in FIG. 10. For 5G, the "UE-data network logical connection modification reject" message may be a PDU SESSION MODIFICATION REJECT message.

FIG. 15 is a flowchart further illustrating some steps of the method in FIG. 9 in accordance with other embodiments of the present disclosure. Compared to the method 1000 in FIG. 10, a method 1500 includes a step 1502 instead of the step 1012. Compared to the step 1012, the UE 302 determines the fourth UE-data network logical connection set further based on the persistence precedence-related QoS parameter correspondingly of each UE-data network logical connection of a sixth UE-data network logical connection set in the third UE-data network logical connection set having the highest persistence precedence.

In the step 1502, the UE 302 determines, out of the third UE-data network logical connection set for the UE 302, a fourth UE-data network logical connection set for each UE-data network logical connection of which a radio bearer allocation acceptance is to be correspondingly performed based on a UE-data network logical connection type correspondingly of each UE-data network logical connection of a fifth UE-data network logical connection set in the third UE-data network logical connection set being non-IP and a persistence precedence-related QoS parameter correspondingly of each UE-data network logical connection of a sixth UE-data network logical connection set in the third UE-data network logical connection set having the highest persistence precedence, wherein an intersection set of the fifth UE-data network logical connection set and the sixth UE-data network logical connection set includes J number of UE-data network logical connections, and the fourth UE-data network logical connection set is in the intersection set and includes K number of UE-data network logical connections, where K<=J, and K=F.

The fifth UE-data network logical connection set includes H number of UE-data network logical connection(s), where H>F. Therefore, the fourth UE-data network logical connection set is determined out of the intersection set of the fifth UE-data network logical connection set and the sixth UE-data network logical connection set, which is a subset of the fifth UE-data network logical connection set. The persistence precedence-related QoS parameter may be 5QI for 5G.

Alternatively, the persistence precedence-related QoS parameter may be QCI for 4G. For both 5QI and QCI, a value of one indicates that the UE-data network logical connection needs to be persistent, and may have the highest persistence precedence. By determining the fourth UE-data network logical connection set out of the intersection set of the fifth UE-data network logical connection set and the sixth UE-data network logical connection set, wherein the UE-data network logical connection type of the fifth UE-data network logical connection set being non-IP and the persistence precedence-related QoS parameter of the sixth UE-data network logical connection set having the highest persistence precedence, the following advantage is achieved. When an IoT application intends for a UE-data network logical connection to be as persistent as possible in the CIoT mode that is invoked, for example, in the limited coverage environment or under the low battery power level condition, it is more likely that the IoT application uses a UE-data network logical connection type being non-IP and a persistence precedence-related QoS parameter having the highest persistence precedence to communicate with an IoT server, Therefore, the UE-data network logical connection is given a higher priority to get a radio bearer set for the UE-data network logical connection to be as persistent as possible in the CIoT mode.

For the E number of UE-data network logical connection (s) in the third UE-data network logical connection set that is non-existing, the persistence precedence-related QoS parameter correspondingly of each of the E number of UE-data network logical connection(s) may be obtained from correspondingly preparing to create a UE-data network logical connection establishment acceptance. A construct of a "UE-data network logical connection establishment accept" message includes a field of the persistence precedence-related QoS parameter, as mentioned in 3GPP TS 24.501 and 3GPP TS 24.301. For the D-E number of UE-data network logical connection(s) in the third UE-data network logical connection set that is existing but without radio bearer(s), the persistence precedence-related QoS parameter correspondingly of each of the D-E number of UE-data network logical connection(s) may be obtained from existing data in the network node 304, as the D-E number of UE-data network logical connection(s) has been established before.

Following the example described for the step 1004 in FIG. 10, for the step 1006 in FIG. 15, the at least one application includes a second non-IoT application of the Y number of non-IoT application(s) in the application set and a first IoT application and a second IoT application of the Z number of IoT application(s) in the application set. The fifth UE-data network logical connection set having the UE-data network logical connection type being non-IP is for serving the first IoT application and the second IoT application, and the UE-data network logical connection set having the UE-data network logical connection type being IP is for serving the second non-IoT application. H is equal to two. The sixth UE-data network logical connection set having persistence precedence-related QoS parameter having the highest persistence precedence is for serving the first IoT application, and the second non-IoT application. The intersection set of the fifth UE-data network logical connection set and the sixth UE-data network logical connection set having the UE-data network logical connection type being non-IP and the persistence precedence-related QoS parameter having the highest persistence precedence is so considered a higher radio bearer allocation acceptance priority. J is equal to one. The fourth UE-data network logical connection set in the intersection set is determined based on F in the step 1010. Because F is equal to one and J is equal to one, K is equal to one. Therefore, the first IoT application is determined to get the DRB.

Figure 16:
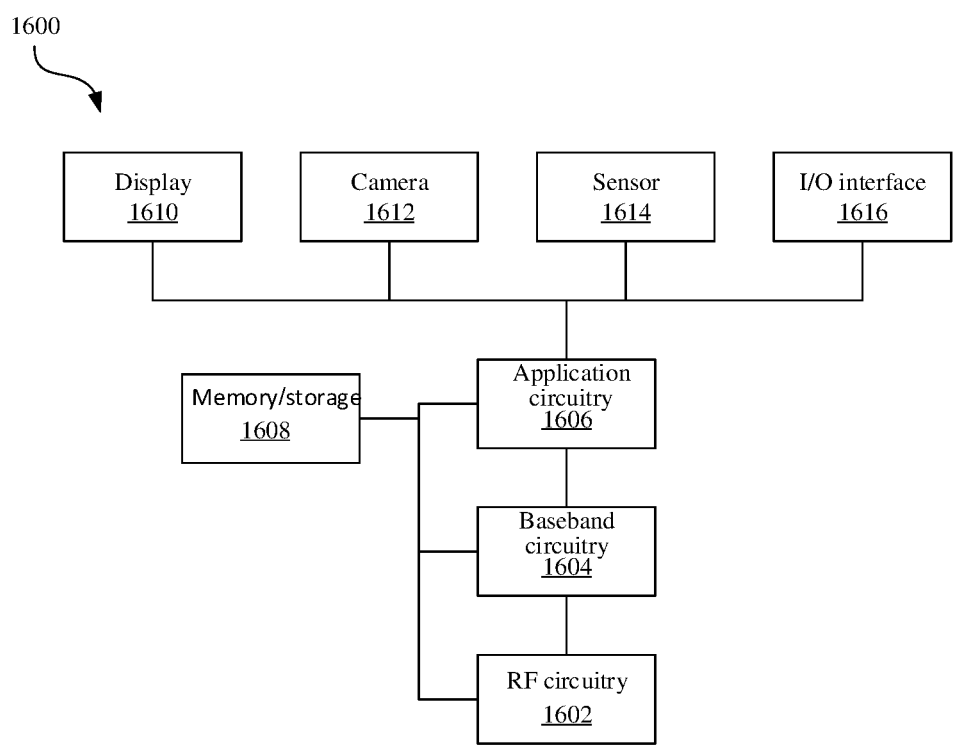
FIG. 16 is a block diagram of a system for wireless communication according to some embodiments of the present disclosure.

FIG. 16 is a block diagram of an example system 1600 for wireless communication according to some embodiments of the present disclosure. Embodiments described herein may be implemented into the system using any suitably configured hardware and/or software. FIG. 16 illustrates the system 1600 including a radio frequency (RF) circuitry 1602, a baseband circuitry 1604, an application circuitry 1606, a memory/storage 1608, a display 1610, a camera 1612, a sensor 1614, and an input/output (I/O) interface 1616, operatively coupled with each other at least as illustrated.

The application circuitry 1606 may include a circuitry, such as, but not limited to, one or more single-core or multi-core processors. The processors may include any combinations of general-purpose processors and dedicated processors, such as graphics processors and application processors. The processors may be operatively coupled with the memory/storage and configured to execute instructions stored in the memory/storage to enable various applications and/or operating systems running on the system.

The baseband circuitry 1604 may include a circuitry, such as, but not limited to, one or more single-core or multi-core processors. The processors may include a baseband processor. The baseband circuitry may handle various radio control functions that enable communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 1604 may include circuitry to operate with signals that are not strictly considered as being in a baseband frequency. For example, in some embodiments, baseband circuitry may include circuitry to operate with signals having an intermediate frequency, which is between a baseband frequency and a radio frequency.

The RF circuitry 1602 may enable communication with wireless networks using modulated electromagnetic radiation through a non-solid medium.

In various embodiments, the RF circuitry may include switches, filters, amplifiers, etc. to facilitate the communication with the wireless network.

In various embodiments, the RF circuitry 1602 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the UE, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules.

In some embodiments, some or all of the constituent components of the baseband circuitry, the application circuitry, and/or the memory/storage may be implemented together on a system on a chip (SOC).

The memory/storage 1608 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 1616 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 1614 may include one or more IoT sensors for a myriad of applications such as health, fitness, connected cars, smart homes, smart cities, etc. In some embodiments, the one or more IoT sensors may include, but are not limited to, an optical sensor, a temperature sensor, a sound pressure sensor, a vibration sensor, a fluid sensor, a gas sensor, a geographic information system location sensor, and/or a location, velocity and acceleration sensor.

In various embodiments, the display 1610 may include a display, such as a liquid crystal display and a touch screen display.

In various embodiments, the system 1600 may be a mobile computing device operatively coupled with an IoT sensor-equipped device that is equipped with the sensor 1614. The computing device may be, but is not limited to be a laptop computing device, a tablet computing device, a netbook, an ultrabook, a smartphone, etc. The IoT sensor-equipped device may be, but is not limited to, a wearable device, a smart meter. Alternatively, the mobile computing device may be equipped with the sensor 1614.

In various embodiments, system may have more or less components, and/or different architectures. Where appropriate, methods described herein may be implemented as a program instructions. The program instructions may be stored on a storage medium, such as a non-transitory storage medium.

A person having ordinary skill in the art understands that each of the units, modules, blocks, algorithm, and steps described and disclosed in the embodiments of the present disclosure are realized using hardware, firmware, software, or a combination thereof. Whether the functions run in hardware, firmware, or software depends on the condition of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, module, and unit in the above-mentioned embodiment since the working processes of the above-mentioned system, device, module, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units or modules is merely based on logical functions while other divisions exist in realization. The units or modules may or may not be physical units or modules. It is possible that a plurality of units or modules are combined or integrated into one physical unit or module. It is also possible that any of the units or modules is divided into a plurality of physical units or modules. It is also possible that some characteristics are omitted or skipped. On the other hand, the displayed or discussed mutual coupling, direct coupling, or communicative coupling operate through some ports, devices, units or modules whether indirectly or communicatively by ways of electrical, mechanical, or other kinds of forms.

The units or modules as separating components for explanation are or are not physically separated. The units or modules are located in one place or distributed on a plurality of network units or modules. Some or all of the units or modules are used according to the purposes of the embodiments. Moreover, each of the functional units or modules in each of the embodiments can be integrated in one processing unit or module, physically independent, or integrated in one processing unit or module with two or more than two units or modules.

If the software function unit or module is realized and used and sold as a product, it can be stored in a computer readable storage medium. Based on this understanding, the technical plan proposed by the present disclosure can be essentially or partially realized as the form of a software product. Or, one part of the technical plan beneficial to the conventional technology can be realized as the form of a software product. The software product is stored in a computer readable storage medium, including a plurality of commands for a processor module of a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program instructions.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A user equipment (UE), comprising:
a memory;
a transceiver; and
a processor operatively coupled with the memory and the transceiver, being capable of causing the UE to operate in a cellular communication mode, and being capable of causing the UE to operate in a Cellular Internet of Things (CIoT) mode;
wherein the processor is configured to cause the UE to perform:
operating in the CIoT mode;
determining, out of at least one UE-data network logical connection, a first UE-data network logical connection in a first set of the at least one UE-data network logical connection for which a radio bear request is to be made based on a UE-data network logical connection type correspondingly of each UE-data network logical connection of the first set of the at least one UE-data network logical connection being non-internet protocol (non-IP) to prevent more than a maximum number of allowable radio bearers for the UE to be requested; and
making the radio bearer request for the first UE-data network logical connection;
wherein the determining, out of a plurality of the UE-data network logical connections, the first UE-data network logical connection in the first set of the UE-data network logical connections for which the radio bear request is to be made is based on a UE-data network logical connection type correspondingly of each UE-data network logical connection of only the UE-data network logical connections;
the determining, out of the UE-data network logical connections, the first UE-data network logical connection in the first set of the UE-data network logical connections for which the radio bear request is to be made is further based on a persistence precedence-related quality of service (QoS) parameter correspondingly of each UE-data network logical connection of a third set of the UE-data network logical connections having the highest persistence precedence; and
the first UE-data network logical connection is in the third set of the UE-data network logical connections.

2. The UE of claim 1, wherein the radio bearer request is a UE-data network logical connection establishment or modification request.

3. The UE of claim 1, wherein
each UE-data network logical connection of a second set of the UE-data network logical connections correspondingly has a UE-data network logical connection type being internet protocol (IP); and
the determining, out of the UE-data network logical connections, the first UE-data network logical connection in the first set of the UE-data network logical connections for which the radio bear request is to be made comprises:
determining that the first set of the UE-data network logical connections considered as a higher radio bearer request priority than the second set of the UE-data network logical connections.

4. The UE of claim 1, wherein the persistence precedence-related QoS parameter correspondingly of each UE-data network logical connection of the third set of the UE-data network logical connections is 5G QoS indicator (5QI).

5. A network node for a cellular communication network, comprising:
a memory;
a transceiver; and
a processor operatively coupled with the memory and the transceiver, being capable of causing the network node to operate in a cellular communication mode, and being capable of causing the network node to operate in a Cellular Internet of Things (CIoT) mode;
wherein the processor is configured to cause the network node to perform:
operating in the CIoT mode;
determining, out of at least one user equipment (UE)-data network logical connection for a UE, a first UE-data network logical connection in a first set of the at least one UE-data network logical connection for which a radio bearer allocation acceptance is to be performed based on a UE-data network logical connection type correspondingly of each UE-data network logical connection of the first set of the at least one UE-data network logical connection of the at least one UE-data network logical connection being non-internet protocol (non-IP) to prevent more than a maximum number of allowable radio bearers for the UE to be allocated; and performing the radio bearer allocation acceptance for the first UE-data network logical connection;

wherein the determining, out of a plurality of the UE-data network logical connections for the UE, the first UE-data network logical connection in the first set of the UE-data network logical connections for which the radio bearer allocation acceptance to be performed is based on a UE-data network logical connection type correspondingly of each UE-data network logical connection of only the UE-data network logical connections;

the determining, out of the UE-data network logical connections for the UE, the first UE-data network logical connection in the first set of the UE-data network logical connections for which the radio bearer allocation acceptance to be performed is further based on a persistence precedence-related quality of service (QoS) parameter correspondingly of each UE-data network logical connection of a third set of the UE-data network logical connections having the highest persistence precedence; and the first UE-data network logical connection is in the third set of the UE-data network logical connections.

6. The network node of claim 5, wherein the radio bearer allocation acceptance is a UE-data network logical connection establishment or modification acceptance.

7. The network node of claim 5, wherein each UE-data network logical connection of a second set of the UE-data network logical connections correspondingly has a UE-data network logical connection type being internet protocol (IP); and the determining, out of the UE-data network logical connections for the UE, the first UE-data network logical connection in the first set of the UE-data network logical connections for which the radio bearer allocation acceptance to be performed comprises:

determining that the first set of the UE-data network logical connections considered as a higher radio bearer allocation acceptance priority than the second set of the UE-data network logical connections.

8. A method for operating a user equipment (UE), comprising:

operating in a Cellular Internet of Things (CIoT) mode, wherein the UE is capable of operating in a cellular communication mode and is capable of operating in the CIoT mode;

determining, out of at least one UE-data network logical connection, a first UE-data network logical connection in a first set of the at least one UE-data network logical connection for which a radio bear request is to be made based on a UE-data network logical connection type correspondingly of each UE-data network logical connection of the first set of the at least one UE-data network logical connection being non-internet protocol (non-IP) to prevent more than a maximum number of allowable radio bearers for the UE to be requested; and making the radio bearer request for the first UE-data network logical connection;

wherein the step of determining, out of a plurality of the UE-data network logical connections, the first UE-data network logical connection in the first set of the UE-data network logical connections for which the radio bear request is to be made is based on a UE-data network logical connection type correspondingly of each UE-data network logical connection of only the UE-data network logical connections;

the step of determining, out of the UE-data network logical connections, the first UE-data network logical connection in the first set of the UE-data network logical connections for which the radio bear request is to be made is further based on a persistence precedence-related quality of service (QoS) parameter correspondingly of each UE-data network logical connection of a third set of the UE-data network logical connections having the highest persistence precedence; and the first UE-data network logical connection is in the third set of the UE-data network logical connections.

9. The method for operating the UE of claim 8, wherein the radio bearer request is a UE-data network logical connection establishment or modification request.

10. The method for operating the UE of claim 8, wherein each UE-data network logical connection of a second set of the UE-data network logical connections correspondingly has a UE-data network logical connection type being internet protocol (IP); and the step of determining, out of the UE-data network logical connections, the first UE-data network logical connection in the first set of the UE-data network logical connections for which the radio bear request is to be made comprises:

determining that the first set of the UE-data network logical connections considered as a higher radio bearer request priority than the second set of the UE-data network logical connections.

11. The method for operating the UE of claim 8, wherein the persistence precedence-related QoS parameter correspondingly of each UE-data network logical connection of the third set of the UE-data network logical connections is 5G QoS indicator (5QI).

12. The method for operating the UE of claim 8, wherein the CIoT mode is a Narrow Band Internet of Things (NB-IoT) mode.

13. The method for operating the UE of claim 8, wherein each UE-data network logical connection of the at least one UE-data network logical connection is a protocol data unit (PDU) session.

14. The method for operating the UE of claim 8, wherein the UE-data network logical connection type correspondingly of each UE-data network logical connection of the first set of the at least one UE-data network logical connection that is non-IP is Ethernet.

\* \* \* \* \*